US008897376B2

(12) United States Patent
Kato

(10) Patent No.: US 8,897,376 B2
(45) Date of Patent: Nov. 25, 2014

(54) DATA RECORDING DEVICE, METHOD, AND PROGRAM, DATA REPRODUCTION DEVICE, METHOD, AND PROGRAM, RECORDING MEDIUM, AND DATA STRUCTURE

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1802 days.

(21) Appl. No.: 11/569,487

(22) PCT Filed: Jun. 3, 2005

(86) PCT No.: PCT/JP2005/010633
§ 371 (c)(1),
(2), (4) Date: Nov. 21, 2006

(87) PCT Pub. No.: WO2005/122567
PCT Pub. Date: Dec. 22, 2005

(65) Prior Publication Data
US 2007/0268971 A1    Nov. 22, 2007

(30) Foreign Application Priority Data

Jun. 7, 2004 (JP) ................................ 2004-168461

(51) Int. Cl.
*H04B 1/66* (2006.01)
(Continued)

(52) U.S. Cl.
CPC ........ *H04N 9/8205* (2013.01); *G11B 2220/213* (2013.01); *G11B 27/329* (2013.01);
(Continued)

(58) Field of Classification Search
None
See application file for complete search history.

(56) References Cited

U.S. PATENT DOCUMENTS 5,543,847 A   8/1996 Kato
6,021,250 A   2/2000 Hyodo et al.
(Continued)

FOREIGN PATENT DOCUMENTS

EP   1 043 892 A1   10/2000
EP   1 280 347 A1   1/2003
(Continued)

OTHER PUBLICATIONS

U.S. Appl. No. 12/960,177, filed Dec. 3, 2010, Kato.
(Continued)

*Primary Examiner* — Mehrdad Dastouri
*Assistant Examiner* — Kristin Dobbs
(74) *Attorney, Agent, or Firm* — Oblon, Spivak, McClelland, Maier & Neustadt, L.L.P.

(57) ABSTRACT

A video stream is encoded with a prediction mode of which a picture later than an I picture in the display order is predicted from a picture earlier than the I picture in the display order and recorded on a record medium so that the video stream reproduced from the record medium is randomly accessible. When a video stream is encoded, the prediction mode of which a picture later than an I picture in the display order is predicted from a picture earlier than the I picture in the display order is prohibited. In addition, EP_map that correlates reproduction time information of an I picture to a packet number of the I picture is created and recorded on the record medium along with a packetized encoded stream. When the video stream is reproduced, EP_map is searched for a packet number corresponding to a designated reproduction time. Corresponding to the obtained packet number, decoding of an encoded stream reproduced from the record medium is controlled. As a result, a random access reproduction designated with a reproduction time is assured.

22 Claims, 18 Drawing Sheets

(51) Int. Cl.
*H04N 7/12* (2006.01)
*H04N 11/02* (2006.01)
*H04N 11/04* (2006.01)
*H04N 9/82* (2006.01)
*G11B 27/32* (2006.01)
*G11B 27/034* (2006.01)
*G11B 27/10* (2006.01)
*H04N 19/51* (2014.01)
*G11B 20/10* (2006.01)
*G11B 20/12* (2006.01)
*H04N 9/804* (2006.01)

(52) U.S. Cl.
CPC ........ *G11B 20/12* (2013.01); *G11B 2220/2541* (2013.01); *G11B 2220/2562* (2013.01); *G11B 2220/216* (2013.01); *G11B 27/034* (2013.01); *H04N 9/8042* (2013.01); *G11B 27/105* (2013.01); *H04N 19/00587* (2013.01); *G11B 2220/218* (2013.01); *G11B 2220/2545* (2013.01); *G11B 20/10* (2013.01)
USPC .................................... 375/240.26

(56) References Cited

U.S. PATENT DOCUMENTS 6,993,248 B1 1/2006 Kato
2002/0135607 A1 9/2002 Kato et al.
2002/0164152 A1* 11/2002 Kato et al. ............... 386/95
2003/0103604 A1* 6/2003 Kato et al. ............... 379/68
2005/0025461 A1 2/2005 Kato et al.
2005/0254798 A1 11/2005 Kato
2008/0063050 A1* 3/2008 Kadono ................ 375/240.01
2010/0080534 A1 4/2010 Kato et al.

FOREIGN PATENT DOCUMENTS

| JP | 6 181 569 | 6/1994 |
| JP | 6-181569 | 6/1994 |
| JP | 2000 341640 | 12/2000 |
| JP | 2000-341640 | 12/2000 |
| JP | 2002-158972 | 5/2002 |
| JP | 2002 158972 | 5/2002 |

OTHER PUBLICATIONS

U.S. Appl. No. 12/614,142, filed Nov. 6, 2009, Kato.
Office Action issued Feb. 14, 2012, in European Application No. 057508/77.2-2202/1755337.
Extended European Search Report issued Nov. 14, 2012, in Patent Application No. 12166835.4.

* cited by examiner

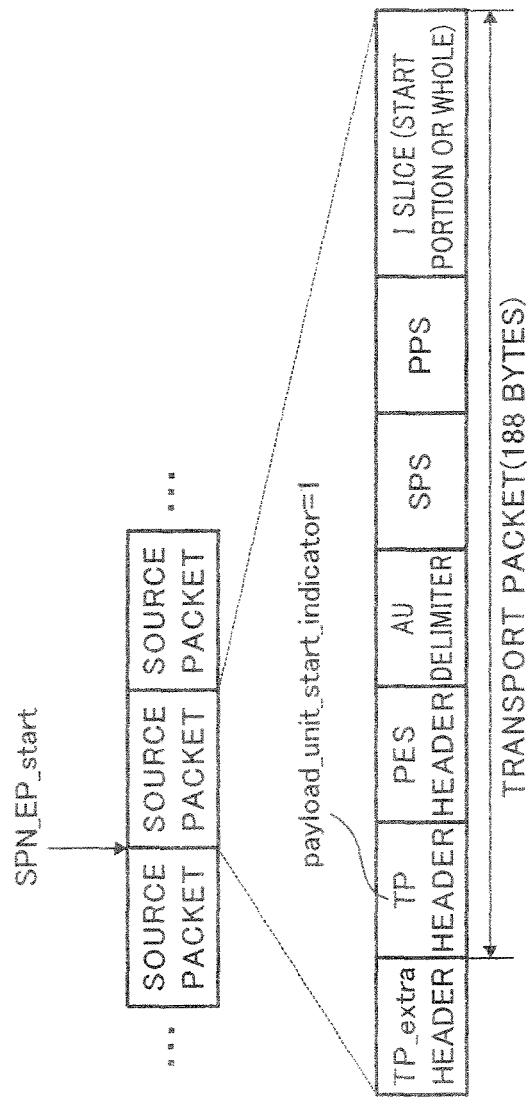

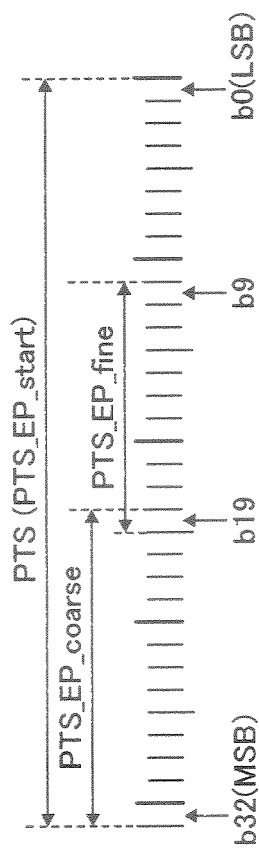

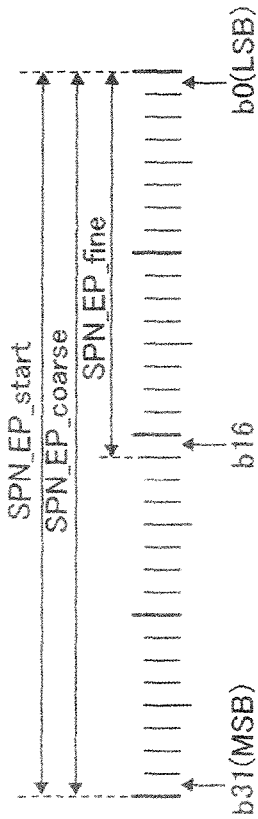

Fig. 11

| SYNTAX | NUMBER OF BITS | MNEMONIC |
|---|---|---|
| EP_map() { | | |
|   reserved_for_word_align | 8 | bslbf |
|   number_of_stream_PID_entries | 8 | uimsbf |
|   for (k=0; k<number_of_stream_PID_entries; k++) { | | |
|     stream_PID [k] | 16 | bslbf |
|     reserved_for_word_align | 10 | bslbf |
|     EP_stream_type [k] | 4 | uimsbf |
|     num_EP_coarse_entries [k] | 16 | uimsbf |
|     num_EP_fine_entries [k] | 18 | uimsbf |
|     EP_map_for_one_stream_PID_start_add32ss [k] | 32 | uimsbf |
|   } | | |
|   for (i=0; i<X; i++) { | | |
|     padding_word | 16 | bslbf |
|   } | | |
|   for (k=0; k<number_of_stream_PID_entries; k++) { | | |
|     EP_map_for_one_stream_PID (EP_stream_type[k], num_EP_coarse_entries[k], num_EP_fine_entries[k]) | | |
|     for (i=0; i<Y[k]; i++) { | | |
|       padding_word | 16 | bslbf |
|     } | | |
|   } | | |
| } | | |

Fig. 12

| SYNTAX | NUMBER OF BITS | MNEMONIC |
|---|---|---|
| EP_map_for_one_stream_PID(EP_stream_type, Nc, Nf) { | | |
|     EP_fine_table_start_address | 32 | uimsbf |
|     for (i=0; i<Nc; i++) { | | |
|         ref_to_EP_fine_id *[i]* | 18 | uimsbf |
|         PTS_EP_coarse *[i]* | 14 | uimsbf |
|         SPN_EP_coarse *[i]* | 32 | uimsbf |
|     } | | |
|     for (i=0; i<X; i++) { | | |
|         padding_word | 16 | bslbf |
|     } | | |
|     for(EP_fine_id = 0; <br>          EP_fine_id < Nf; <br>          EP_fine_id ++) { | | |
|         EP_video_type *[EP_fine_id]* | 1 | bslbf |
|         I_end_position_offset *[EP_fine_id]* | 3 | bslbf |
|         PTS_EP_fine *[EP_fine_id]* | 11 | uimsbf |
|         SPN_EP_fine *[EP_fine_id]* | 17 | uimsbf |
|     } | | |
| } | | |

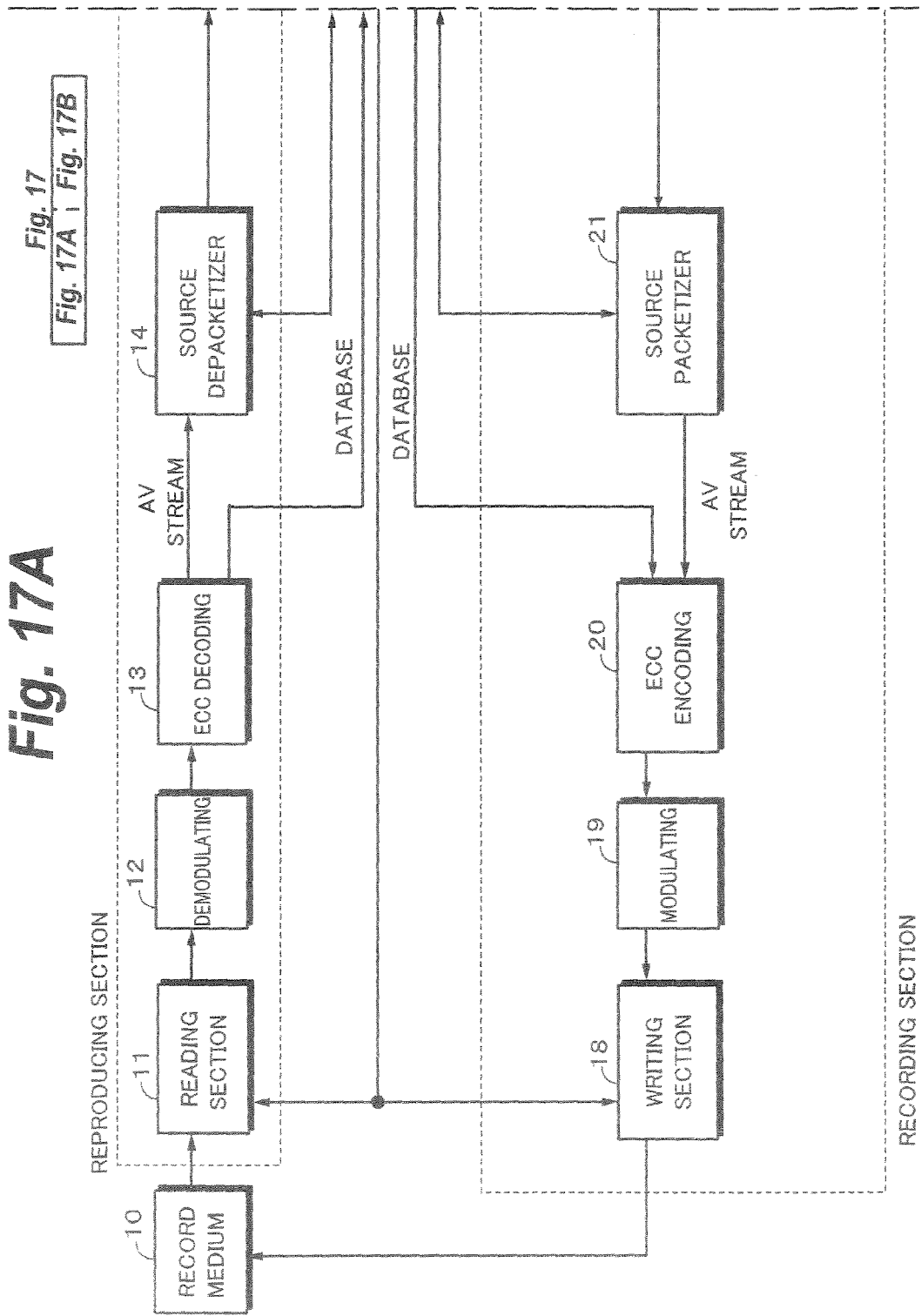

DATA RECORDING DEVICE, METHOD, AND PROGRAM, DATA REPRODUCTION DEVICE, METHOD, AND PROGRAM, RECORDING MEDIUM, AND DATA STRUCTURE

TECHNICAL FIELD

The present invention relates to data recording apparatus, method, and program, data reproducing apparatus, method, and program, a record medium, and a data structure that allow video data that are inter-frame compressed to be recorded and reproduced.

BACKGROUND ART

Technologies of recording an AV (Audio, Video) stream into which video data and audio data are multiplexed on a record medium have been practically used. In addition, technologies of recording information about random accessible positions of an AV stream as attribute information to a record medium along with the AV stream and reproducing the AV stream with the attribute information, allowing the read positions to be decided and a decoding process to be quickly performed, are described in Parent Document 1 "Japanese Patent Application Laid-Open No. 2000-341640" and Patent Document 2 "Japanese Patent Application Laid-Open No. 2002-158972".

As a more specific example, the case of which a transport stream as an AV stream into which MPEG2 video streams are multiplexed will be described. An MPEG video stream is made by compression-encoding video data according to the MPEG2 (Moving Pictures Experts Group 2) system.

According to the MPEG2 (Moving Pictures Experts Group 2), video data are compression-encoded by intra-frame compression-encoding using DCT (Discrete Cosine Transform) and inter-frame compression-encoding using prediction encoding in time base directions. In this case, B (Bidirectionally) picture and P (Predictive) picture that are prediction-encoded in time base directions and I (Intra) picture that is complete with one screen (one frame) are defined. A group that contains at least one I picture and that is complete is referred to as a GOP (Group Of Picture). One GOP is the minimum accessible unit of an MPEG stream.

A transport stream is transmitted, recorded, and reproduced with transport packets each of which has a predetermined size. A data stream is divided by the size of a payload of a transport packet. A header is added to a payload. As a result, a transport packet is completed.

According to the foregoing Patent Document 1 and Patent Document 2, time management information (PTS: Presentation Time Stamp) of a reproduction output of an I picture that starts with a sequence header of MPEG2 video and a source packet number of an AV stream file of a transport packet (source packet) that contains a first byte of the sequence header in the payload are taken out of the transport stream. The obtained PTS and source packet number are recorded as a random accessible position, namely information about an entry point (EP), to attribute information referred to as EP_map for each entry point.

On the other hand, an encoding method that uses a prediction mode in which a picture that is later than an I picture that belongs to the current GOP in the display order is predicted from a picture that belongs to a GOP that is earlier than the current GOP in the display order has been proposed. When a transport stream is encoded using this prediction mode, if it is randomly acceded with GOPs, they are not fully reproduced. A technology of allowing such an AV stream file to be randomly accessed with an I picture that belongs to the current GOP by prohibiting such a prediction mode has been disclosed in Patent Document 3 "U.S. Pat. No. 5,543,847".

Next, this technology will be described with reference to FIG. 1A and FIG. 1B. In FIG. 1A and FIG. 1B, "i12" represents an I picture; "p02", "p03", . . . represent P pictures; and "b00", "b01", . . . represent B pictures. The upper row and the lower row of each of FIG. 1A and FIG. 1B represent for example even fields and odd fields, respectively.

Patent Document 3 proposes that a P picture is predicted from the nearest two P pictures. Thus, in the example shown in FIG. 1A, the picture p16 that belongs to GOP 1 is encoded with two most adjacent P pictures as reference pictures that are the picture p13 that belongs to the current GOP 1 and the picture p03 that belongs to GOP 0 that is earlier than GOP 1. When GOP 1 is randomly accessed, it is reproduced from the picture i12. Since the picture p13 cannot reference the picture p03 used as a reference picture, the picture p13 cannot be decoded. In addition, the picture p16 that uses the pictures p03 and p13 as reference pictures cannot be decoded. Likewise, the picture p17 that uses the pictures p13 and p16 as reference pictures cannot be decoded.

Thus, when video data are encoded, it is prohibited that the pictures p13 and p16 use the picture p03 as a reference picture that belongs to GOP 0 that is earlier than GOP 1. Instead, the pictures p13 and p16 use the picture i12 that belongs to GOP 1 as a reference picture. Thus, when GOP 1 is randomly accessed, the picture p13 and p16 are predicted from the picture i12 as a reference picture. Thus, pictures after the picture p17 can be decoded.

Likewise, in FIG. 1B, the picture p18 that belongs to GOP 1 is encoded with two most adjacent reference pictures of the picture p15 that belongs to GOP 1 and the picture p03 that belongs to GOP 0 earlier than GOP 1. When GOP 1 is randomly accessed, it is reproduced from the picture i12. Since the picture p15 cannot reference the picture p03 used as a reference picture, the picture p15 cannot be decoded. Likewise, the picture p18 that uses the pictures p03 and p15 as reference pictures cannot be decoded.

In this case, when the video stream is encoded, it is prohibited that the pictures p15 and p18 use the picture p03 as a reference picture that belongs to GOP 0 earlier than GOP 1. The pictures p15 and p18 use the picture i12 as a reference picture that belongs to GOP 1. Thus, when GOP 1 is randomly accessed, the pictures p15 and p18 are predicted from the picture i12 as a reference picture. As a result, the picture p18 can be decoded.

In the foregoing EP_map, the position of an I picture of a video stream is used as an entry point. In the MPEG2 video, there is no prediction mode of which a picture later than an I picture that belongs to the current GOP is in the display order is predicted from a picture that belongs to a GOP later than the current GOP in the display order. Thus, when an I picture is used as an entry point, it is assured that the current GOP is randomly accessed and reproduced from the I picture.

However, in recent years, a moving picture compression-encoding system, MPEG-4 AVC|H.264, has been internationally standardized by ISO (International Organization for Standardization). The MPEG-4 AVC|H.264 system accomplishes higher encoding efficiency and compression rate than do the conventional encoding systems such as MPEG2 and MPEG4 systems. In addition, the MPEG-4 AVC|H.264 system achieves high transmission efficiency using a plurality of transmission channels through which data are transmitted. Thus, the MPEG-4 AVC|H.264 system can transmit video streams with higher degree of freedom than the related art systems.

Since the MPEG-4 AVC|H.264 system can have a plurality of reference pictures, it can reference a plurality of past pictures. For example, in the MPEG-4 AVC|H.264 system, a P picture that is later than a particular I picture can be predicted from P pictures that are earlier than the I picture in the display order.

Thus, in the related art, when a video stream that has been encoded by an encoding system such as the MPEG-4 AVC|H.264 system that can reference a plurality of past pictures is recorded to a record medium and then reproduced therefrom, if an I picture is recorded as an random-accessible position (entry point) to EP_map, it is not assured that pictures that are random-access reproduced do not usually start with an I picture.

DISCLOSURE OF THE INVENTION

Therefore, an object of the present invention is to provide data recording apparatus, method, and program, data reproducing apparatus, method, and program, a record medium, and a data structure that allow a video stream reproduced from a record medium to be randomly accessed when the video stream has been encoded and recorded with a prediction mode of which a picture later than an I picture in the display order is predicted from a picture as a reference picture earlier than the I picture in the display order.

A first aspect of the present invention is a data recording apparatus which encodes a video stream according to a prediction encoding method and records the encoded video stream to a record medium, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data recording apparatus comprising: encoding means for encoding the video stream in such a manner that the prediction encoding method is prohibited and generating an encoded video stream, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit; table creating means for creating a table which correlates reproduction time information of the independently decodable picture in the encoded video stream to position information in the encoded video stream; and recording means for correlating the encoded video stream encoded by the encoding means to the table created by the table creating means and recording the correlated video stream and table to the record medium.

A second aspect of the present invention is a data recording method of encoding video stream according to a prediction encoding method and recording the encoded video stream to a record medium, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data recording method comprising the steps of: encoding the video stream in such a manner that the prediction encoding method is prohibited and generating an encoded video stream, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit; creating a table which correlates reproduction time information of the independently decodable picture in the encoded video stream to position information in the encoded video stream; and correlating the encoded video stream encoded at the encoding step to the table created at the table creating step and recording the correlated video stream and table to the record medium.

A third aspect of the present invention is a data recording program which causes a computer device to execute a data recording method of encoding video stream according to a prediction encoding method and recording the encoded video stream to a record medium, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data recording method comprising the steps of: encoding the video stream in such a manner that the prediction encoding method is prohibited and generating an encoded video stream, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit; creating a table which correlates reproduction time information of the independently decodable picture in the encoded video stream to position information in the encoded video stream; and correlating the encoded video stream encoded at the encoding step to the table created at the table creating step and recording the correlated video stream and table to the record medium.

A fourth aspect of the present invention is a data reproducing apparatus which reproduces data from a record medium on which a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data reproducing apparatus comprising: reproducing means for reproducing data from the record medium on which the video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream have been correlatively recorded; and decode controlling means for decoding the encoded video stream reproduced by the reproducing means from a position indicated by the position information corresponding to the reproduction time information in the encoded video stream based on the table reproduced by the reproducing means.

A fifth aspect of the present invention is a data reproducing method of reproducing data from a record medium on which a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data reproducing method comprising the steps of: reproducing data from the record medium on which the video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream have been correlatively recorded; and decoding the encoded video stream reproduced at the reproducing step from a position indicated by the position information corresponding to the reproduction time information in the encoded video stream based on the table reproduced at the reproducing step.

A sixth aspect of the present invention is a data reproducing program which causes a computer device to execute a data reproducing method of reproducing data from a record medium on which a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, the data reproducing method comprising the steps of: reproducing data from the record medium on which the video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream have been correlatively recorded; and decoding the encoded video stream reproduced at the reproducing step from a position indicated by the position information corresponding to the reproduction time information in the encoded video stream based on the table reproduced at the reproducing step.

A seventh aspect of the present invention is a record medium on which a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. The video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream having been correlatively recorded.

An eighth aspect of the present invention is a data structure of a video stream which has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. The video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream having been correlated.

According to the first, second, and third aspects of the present invention, in a data recording method of encoding video stream according to a prediction encoding method and recording the encoded video stream to a record medium, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. The video stream is encoded in such a manner that the prediction encoding method is prohibited and generating an encoded video stream, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. A table which correlates reproduction time information of the independently decodable picture in the encoded video stream to position information in the encoded video stream is created. The encoded video stream is correlated to the created table. The correlated video stream and table are recorded on the record medium. Thus, when data are reproduced from the record medium, by designating a reproduction time, a random-access reproduction for an encoded video stream reproduced from the record medium is assured.

According to the fourth, fifth, and sixth aspect of the present invention, data are reproduced from a record medium on which a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. Data are reproduced from the record medium on which the video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream have been correlatively recorded. The reproduced encoded video stream is decoded from a position indicated by the position information corresponding to the reproduction time information in the encoded video stream based on the reproduced table. Thus, by designating a reproduction time, a random-access reproduction for an encoded video stream reproduced from the record medium is assured.

According to the seventh aspect of the present invention, a video stream has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit.

The video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream having been correlatively recorded. Thus, when an encoded video stream is reproduced from the record medium, by designating a reproduction time, a random-access reproduction is assured.

According to the eighth aspect of the present invention, in a data structure of a video stream which has been encoded according to a prediction encoding method and recorded, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit. The video stream encoded and generated in such a manner that the prediction encoding method is prohibited, the video stream being encoded in units of which one unit as a current unit is a set of pictures starting with an independently decodable picture and ending with a picture earlier than an independently decodable picture that belongs to a unit later than the current unit in a decoding order, in the prediction encoding method, a picture later than an independently decodable picture that belongs to the current unit in a display order is predicted from a picture that belongs to a unit earlier than the current unit, and a table which correlates reproduction time information of the independently decodable picture in the encoded video stream to position information in the encoded video stream having been correlated. Thus, when an encoded stream having the data structure is reproduced, by designating a reproduction time, a random-access reproduction is assured.

According to the present invention, in a video encoding system having a prediction mode of which a picture later than an I picture that belongs to the current GOP is predicted from a picture that belongs to a GOP earlier than the current GOP, an AV stream is encoded in such a manner that the prediction mode of which a picture later than an I picture that belongs to the current GOP is predicted from a picture that belongs to a GOP earlier than the current GOP is prohibited. EP_map having a PTS of an access unit which starts with an I picture encoded in such a manner that the prediction mode is prohibited or an IDR picture defined in MPEG 4 AVC|H.264 as an entry point is created. EP_map and the AV stream are recorded on the record medium. As a result, a random-access reproduction from an entry point indicated by EP_map in the AV steam is assured.

BRIEF DESCRIPTION OF DRAWINGS

FIG. 7 is a schematic diagram showing an example of a data structure of a source packet that field SPN_EP_start indicates;

FIG. 9 is a schematic diagram describing EP_map in more detail;

FIG. 10 is a schematic diagram describing EP_map in more detail;

FIG. 11 is a schematic diagram showing an example of the syntax of a table EP_map_for_one_stream_PID ( );

FIG. 12 is a schematic diagram showing an example of the syntax of block EP_map_for_one_stream_PID;

FIG. 17A and FIG. 17B are block diagrams showing an example of a structure of a moving picture recording and reproducing apparatus according to an embodiment of the present invention.

BEST MODES FOR CARRYING OUT THE INVENTION

Figure 1A:
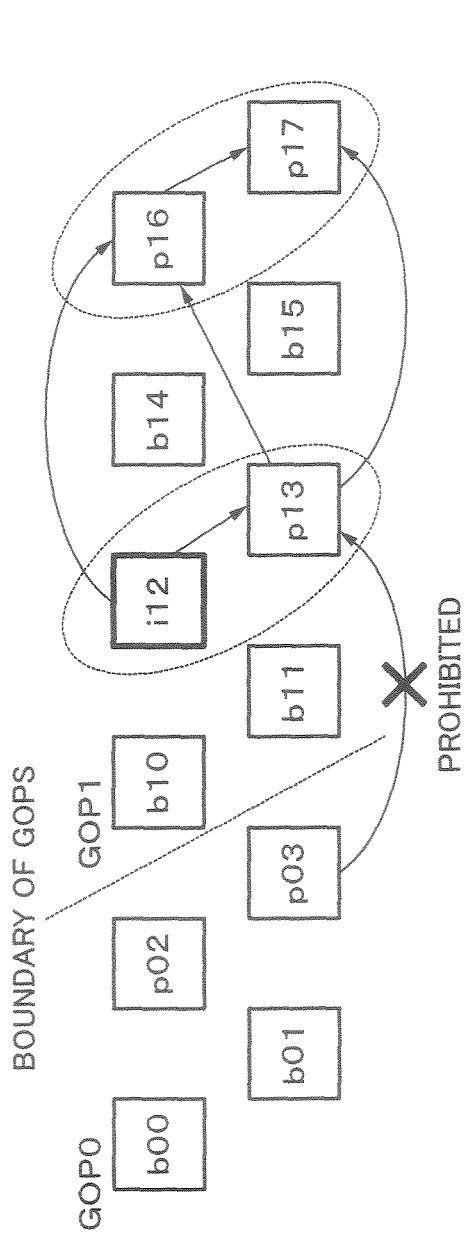
FIG. 1A and FIG. 1B are schematic diagrams describing a prediction mode of which a picture later than an I picture that belongs to the current GOP is predicted from a picture that belong to a GOP that is earlier than the current GOP in the display order according to related art.
Figure 1B:
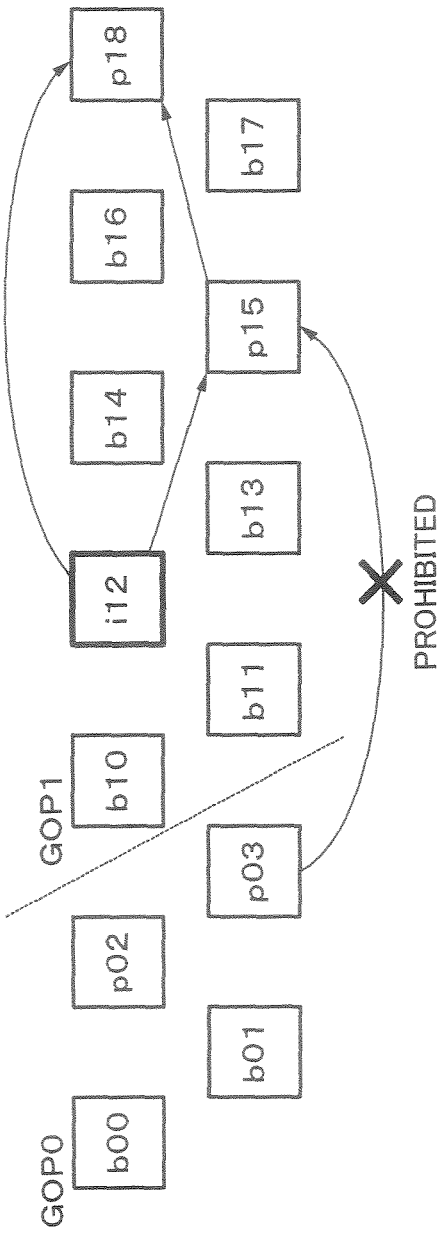
Figure 2:
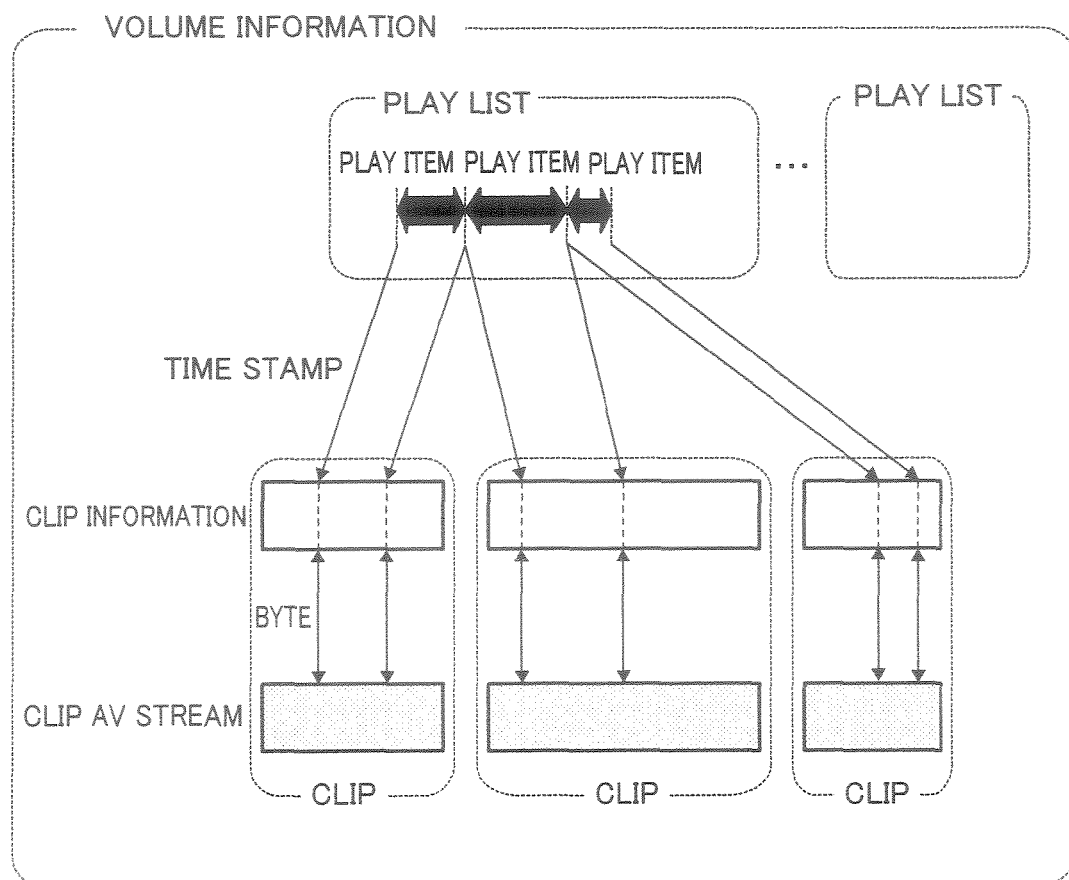
FIG. 2 is a schematic diagram showing an outlined structure of an application format on a record medium used in a recording and reproducing system according to the present invention.

Next, embodiments of the present invention will be described. FIG. 2 shows an outlined structure of an application format on a record medium used in a recoding and reproducing system according to the present invention. This format has two layers, PlayList and Clip with which an AV stream is managed.

A pair of one AV stream and its additional information are considered as one object and called a clip. An AV stream file that contains an AV stream is called a clip AV stream file, whereas a file that contains the corresponding additional information is called a clip information file.

The content of a clip AV stream file is mapped on the time axis. A play list is designated by a time stamp corresponding to an access point in a clip. When a play list indicates an access point of a clip with a time stamp, a clip information file is used to find address information that indicates a decode start address for the stream.

A play list is a set of reproduction regions of a clip. One reproduction region is called a play item (PlayItem). A play item is a pair of an IN point and an OUT point on the time axis. Thus, a play list is a set of play items.

All play lists and clips recorded on one disc are managed with volume information.

Figure 3:
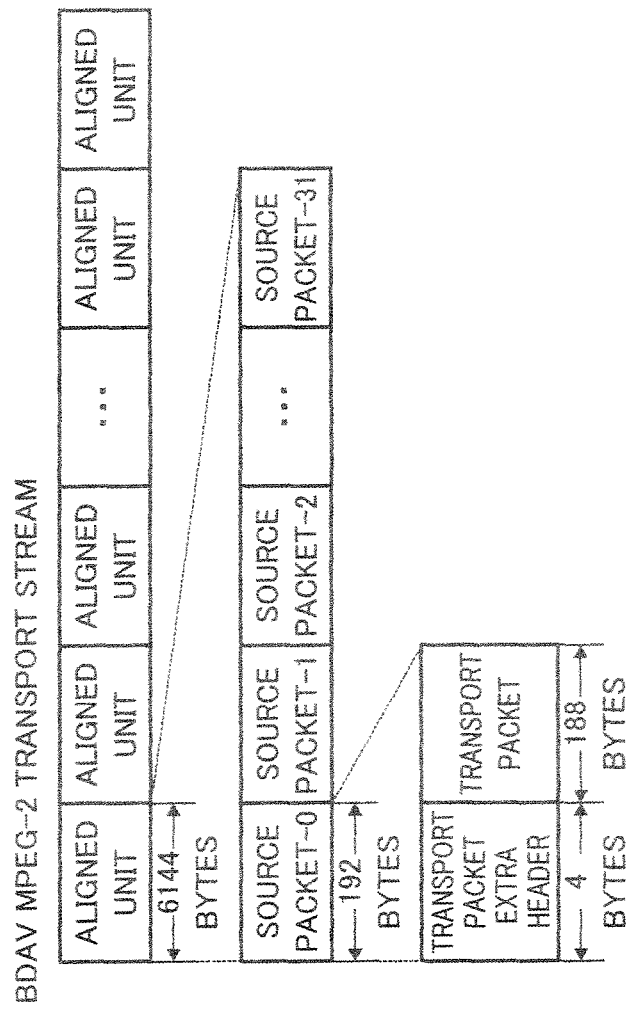
FIG. 3 is a schematic diagram showing an outlined structure of an AV stream recorded on a record medium used in the recording and reproducing system according to the present invention.

FIG. 3 shows an outlined structure of an AV stream recorded on a record medium used in the recording and reproducing system according to the present invention. According to the present invention, an AV stream is treated as a BDAV (Blu-ray Disc Audio/Video) MPEG2 transport stream on a record medium. A BDAV MPEG2 transport stream is made up of an integer number of aligned units having a size of 6144 bytes each.

An aligned unit is made up of 32 source packets. A source packet has a size of 192 bytes. One source packet is made up of a transport packet extra header (TP_extra header) having a size of four bytes and a transport packet having a size of 188 bytes.

Data of a video stream and an audio stream are contained in MPEG2 PES (Packetized Elementary Stream) packets. In other words, data of a video stream and an audio stream are appropriately divided and packed in a data portion of each PES packet. A PES packet header that contains a stream ID that identifies the type of an elementary stream transmitted by the current PES packet is added to the PES packet data portion. In such a manner, a PES packet is formed.

A PES packet is transformed into a transport packet. In other words, a PES packet is divided by the size of a payload of a transport packet. A transport packet header is added to the payload in a predetermined manner. As a result, a transport packet is formed. The transport packet header contains a PID (Packet ID) that is identification information for data contained in the payload.

Source packets are assigned source packet numbers that start with 0 (for the beginning of a clip AV stream) and that increment by one by one. Aligned units start with a first byte of a source packet.

The foregoing clip information file contains EP_map. As was described in the "Background Art" section, when access points of a clip are assigned time stamps, EP_map is used to find a data address from which data reading is started in a clip AV stream file. EP_map is a list of entry points (EP) taken out of an elementary stream and a transport stream. EP_map has address information to search for an entry point at which decoding is started in an AV stream. One EP entry of EP_map is made up of a pair of a presentation time stamp (PTS) and a data address of an access unit corresponding to the PTS in an AV stream. In the MPEG4 AVC|H.264 system, one access unit corresponds to one picture.

Figure 4:
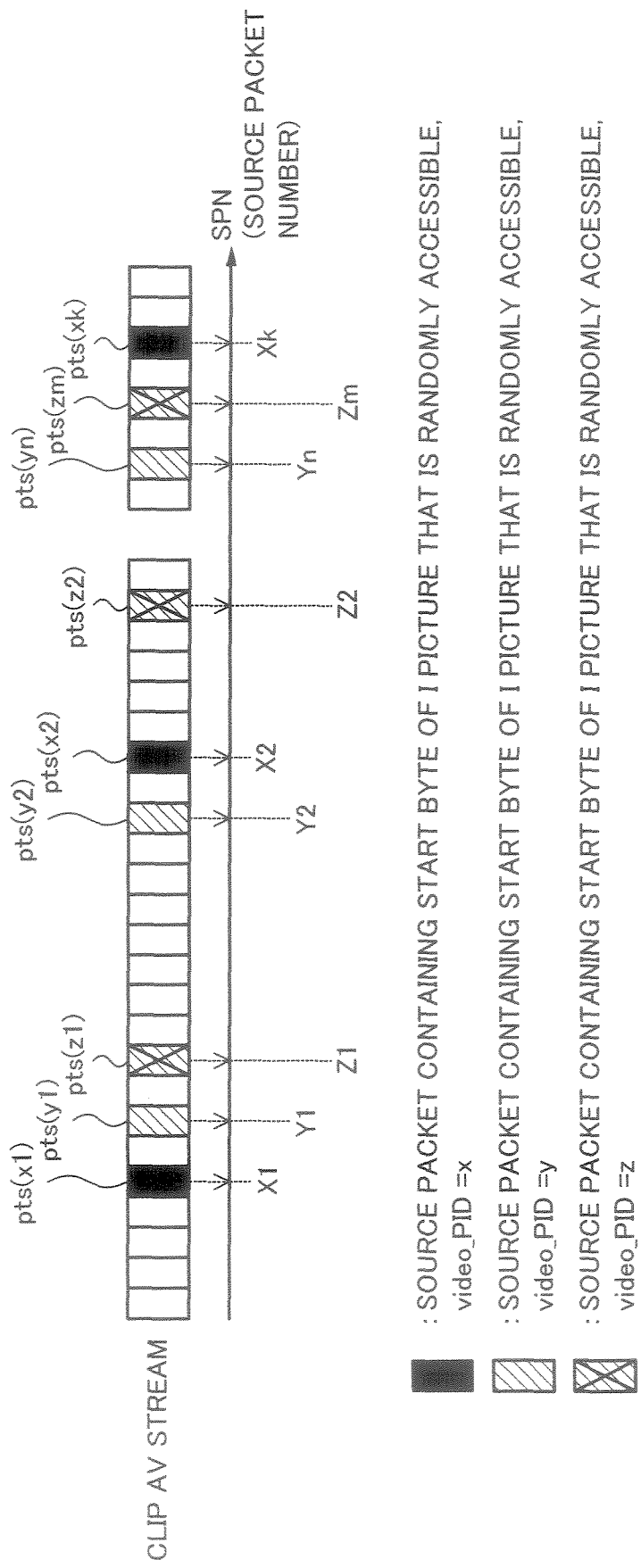
FIG. 4 is a schematic diagram showing an example of a clip AV stream describing EP_map.

Next, with reference to FIG. 4 and FIG. 5, EP_map will be described. FIG. 4 shows an example of a clip AV stream used to describe EP_map. In the example shown in FIG. 4, a clip AV stream is made up of three video streams multiplexed. Each video stream is identified by a PID (Packet Identification) contained in the header of a transport packet of each source packet. In the example shown in FIG. 4, three video streams identified by PID=x, PID=y, and PID=z are multiplexed into one clip AV stream.

Each video stream can be randomly accessed at the position of an I picture. In FIG. 4, source packets, denoted by squares, of three video streams containing a start byte of an I picture are identified by a shaded pattern, a hatched pattern, and a crossed ("X") hatched pattern, respectively. Other squares that neither shaded, nor hatched denote source packets containing video data that are not random access points and source packets containing other than video data.

For example, in a video stream identified by PID=x, a source packet that contains the start byte of an I picture that is randomly accessible and that has a source packet number of X1 is placed at a position of PTS=pts(x1) on the time axis of a clip AV stream. Likewise, in the same video stream, a source packet that contains the start bytes of an I picture that is randomly accessible and that has a source packet number of X2 is placed at a position of PTS=pts(x2) on the time axis.

Figure 5:
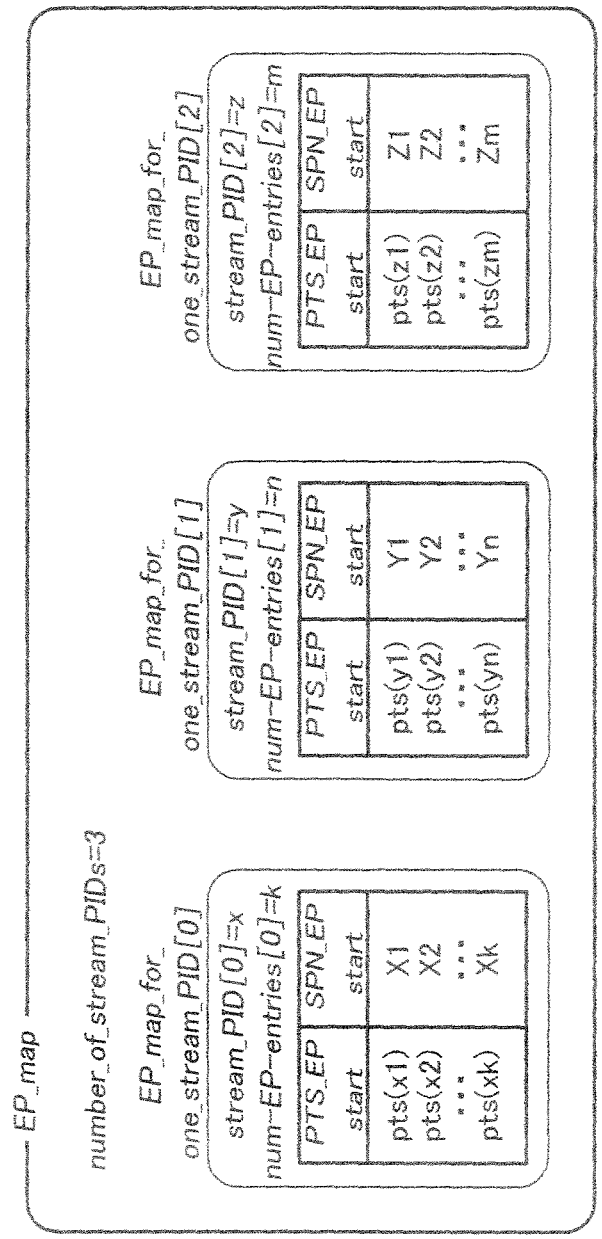
FIG. 5 is a schematic diagram showing a conceptual example of EP_map.

FIG. 5 shows a conceptual example of EP_map corresponding to the clip AV stream shown in FIG. 4. In the example shown in FIG. 5, EP_map has data of a field stream_PID, an entry PTS_EP_start, and an entry SPN_EP_start. The field stream_PID contains PID of a transport packet with which a video stream is transmitted. The entry PTS_EP_start contains a PTS of an access unit (that will be described later) that starts with an I picture that is randomly accessible. The entry SPN_EP_start contains the address of a source packet including a first byte of an access unit that is referenced by the value of the entry PTS_EP_start in an AV stream.

With reference to the example shown in FIG. 4, in EP_map, the PID of each video stream is stored in the field stream_PID. For the field stream_PID, the table EP_map_for_one_stream_PID ( ) that correlates the entry PTS_EP_start and the entry SPN_EP_start is created. For example, in FIG. 5, for the video stream Identified by PID=x, the table EP_map_for_one_stream_PID[0] correlates PTS=pts(x1) and source packet number X1; PTS=pts(x2) and source packet number X2; . . . ; and PTS=pts(xk) and source packet number Xk. This table is created for each of video streams multiplexed and identified by other PIDs. EP_map is contained in a clip information file corresponding to the clip AV stream.

Figures 6A, 6B, 6C:
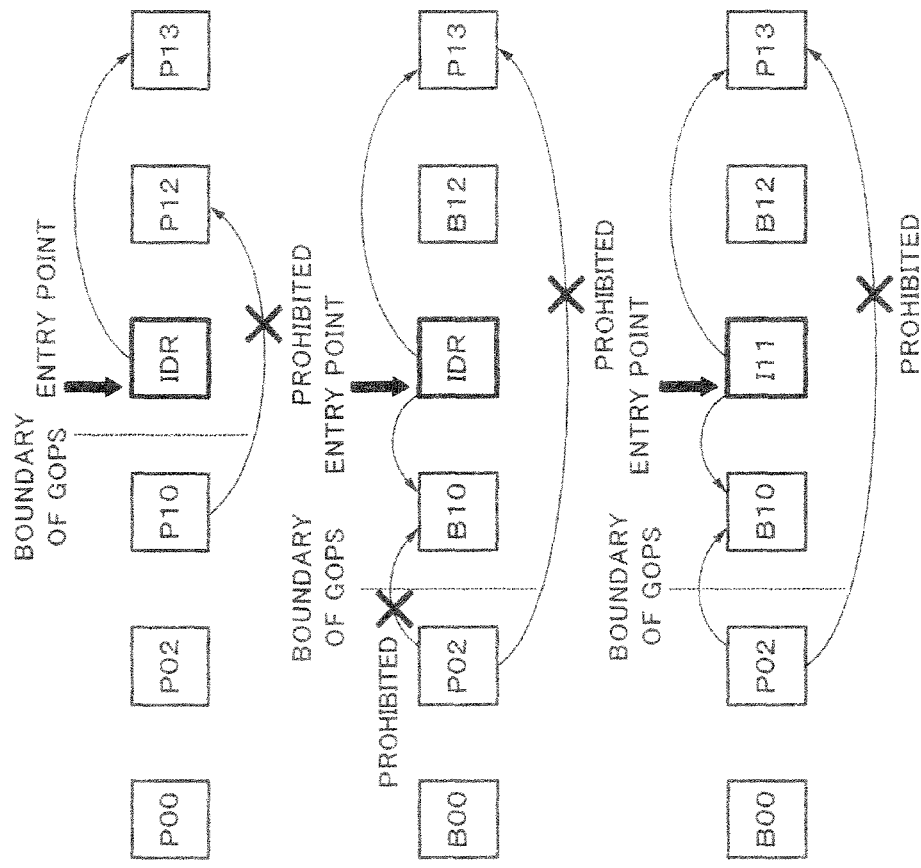
FIG. 6A, FIG. 6B, and FIG. 6C are schematic diagrams describing access units starting with a random-accessible I picture.

FIG. 6A, FIG. 6B, and FIG. 6C are schematic diagrams describing an access unit that starts with an I picture that is randomly accessible. In FIG. 6A, FIG. 6B, and FIG. 6C, squares denotes pictures. A picture indicated by an arrow of "entry point" denotes an access unit starting with an I picture that is randomly accessible. FIG. 6A and FIG. 6B show IDR pictures defined in the MPEG-4 AVC|H.264 system. In the MPEG-4 AVC|H.264 system, it is prohibited that a picture later than an IDR picture in the decoding order is predicted from a picture earlier than the IDR picture in the decoding order.

In the MPEG-4 AVC|H.264 system, a series of access units is called a "sequence". Each sequence can be independently decoded. A sequence needs to start with an IDR picture. For each IDR picture, buffers are reset. In addition, it is prohibited that a picture earlier than a IDR picture in the decoding order is referenced from a picture later than the IDR picture in the decoding order. Thus, each sequence can be independently decoded from the beginning.

In the example shown in FIG. 6A, when the video stream is encoded, it is prohibited that the picture p12 that is later than an IDR picture in the decoding order is predicted from a picture p10 that is earlier than the IDR picture in the decoding order. In the example shown in FIG. 6B, it is assumed that pictures after "boundary of GOP" are decoded in the order of the IDR picture, picture b10, picture p13, and picture b12. At this point, since the picture b10 is later than IDR picture in the decoding order, when the video stream is encoded, it is prohibited that the picture B10 is predicted from the picture p02 earlier than the IDR picture. Likewise, in FIG. 6B, it is prohibited that the picture p13 is predicted from the picture p02.

FIG. 6C shows an example of which the IDR picture shown in FIG. 6B is substituted with an I picture (picture i11). In this case, when the video stream is encoded, it is prohibited that a picture later than the picture i11 that belongs to the current GOP in the display order is predicted from a picture that belongs to a GOP earlier than the current GOP in the display order. In the example shown in FIG. 6C, when the video stream is encoded, it is prohibited that the picture p13 is predicted from the picture p02.

The MPEG-4 AVC|H.264 system does not explicitly define GOP unlike the MPEG2 system. According to this embodiment of the present invention, a set of pictures starting with an IDR picture or an I picture in the decoding order is called a GOP for convenience. The MPEG-4 AVC|H.264 system allows a plurality of inter-frame encoding types such as an I slice, a P slice, and a B slice to be mixed in one picture. According to this embodiment of the present invention, an I picture represents a picture that contains only I slices.

FIG. 7 shows an example of a data structure of source packets indicated by the field SPN_EP_start. As was described above, a source packet is made up by adding header TP_extra_header having a size of four bytes to a transport packet having a size of 188 bytes. A transport packet portion is made up of a header portion (TP header) and a payload portion. A field SPN_EP_start contains a source packet number of a source packet containing a first byte of an access unit that starts with an IDR picture or an I picture described in FIG. 6A, FIG. 6B, and FIG. 6C. In the MPEG-4 AVC|H.264 system, an access unit, namely a picture, starts with an AU delimiter (Access Unit Delimiter). The AU delimiter is followed by an SRS (Sequence Parameter Set) and a PPS (Picture Parameter Set), followed by a start portion or the whole of slice data of an IDR picture or an I picture described in FIG. 6A, FIG. 6B, and FIG. 6C.

When the value of a flag payload_unit_start_indicator of the header (TP header) of a transport packet is "1", it indicates that a new PES packet starts with the payload of the transport packet and that an access unit starts with the source packet.

Next, with reference to FIG. 8, FIG. 9, and FIG. 10, EP_map will be described in more detail. As exemplified in FIG. 8, the table EP_map_for_one_stream_PID ( ) is made up of two sub tables EP_coarse and EP_fine. The sub table EP_coarse is a table used to make a search in a coarse unit, whereas the sub table EP_fine is a table used to make a search in a fine unit. Since EP_map is made up of these two tables, the data size of the table EP_map_for_one_stream_PID ( ) can be reduced and the performance of a data search can be improved.

Figure 8:
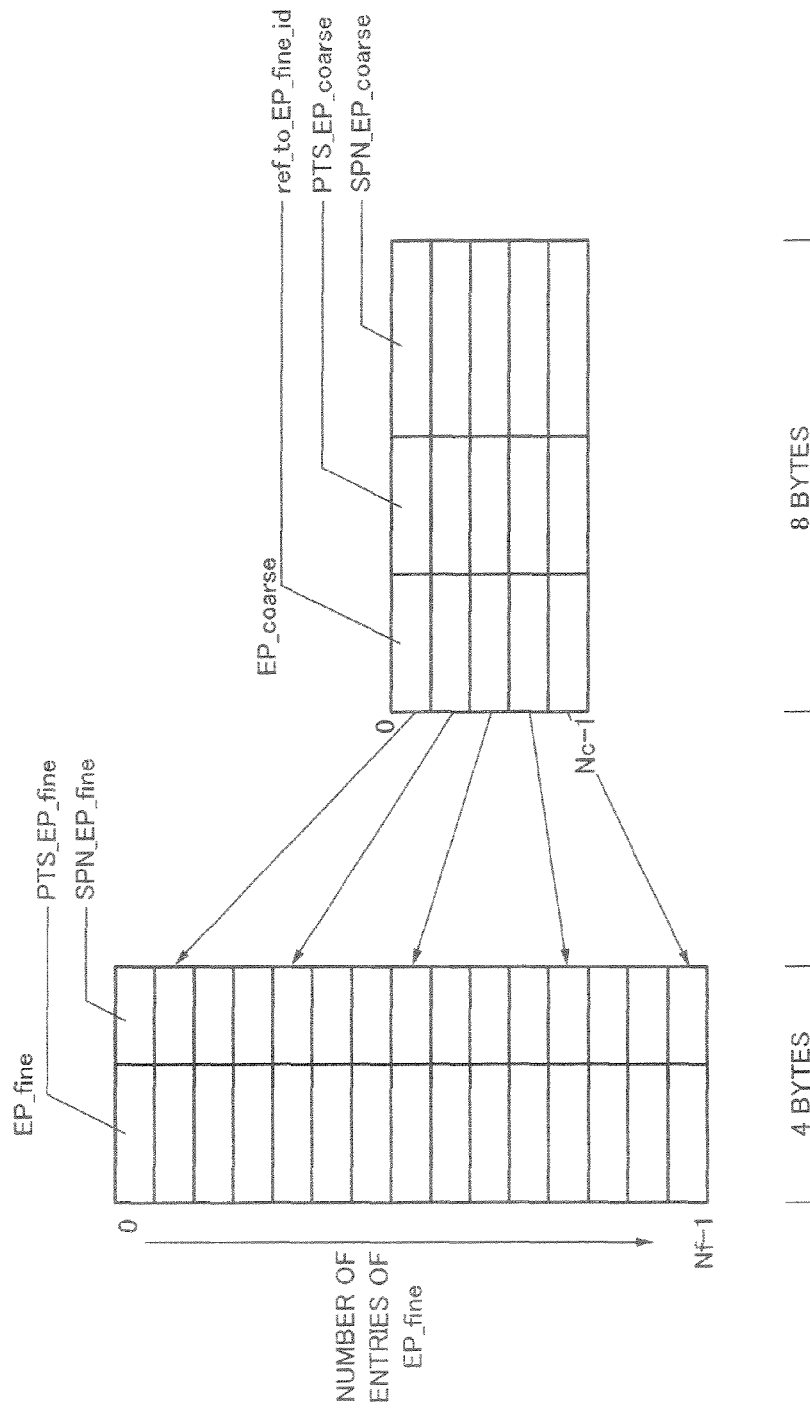
FIG. 8 is a schematic diagram describing EP_map in more detail.

In the example shown in FIG. 8, the sub table EP_fine is a table that correlates the entry PTS_EP_fine to the entry SPN_EP_fine. In the sub table, entries are assigned entry numbers starting with for example 0 for the top entry in the ascending order. In the sub table EP_fine, the data width of the entry PTS_EP_fine and the entry SPN_EP_fine is four bytes in total. In contrast, the sub table EP_coarse is a table that correlates an entry ref_to_EP_fine_id, an entry PTS_EP_coarse, and an entry SPN_EP_coarse. The data width of the entry ref_to_EP_fine_id, the entry PTS_EP_coarse, and the entry SPN_EP_coarse is eight bytes in total. The number of entries, Nf, of the sub table EP_fine is smaller than the number of entries, Nc, of the sub table EP_coarse.

Entries of the sub table EP_fine are made up of bit information on the LSB (Least Significant Bit) side of each of the entry PTS_EP_start and the entry SPN_EP_start of EP_map. Entries of the sub table EP_coarse are made up of bit information on the MSB (Most Significant Bit) side of each of the entry PTS_EP_start and the entry SPN_EP_start and the corresponding entry number in the sub table EP_fine. This entry number is an entry of the sub table EP_fine, having bit information on the LSB side, taken out of the same data PTS_EP_start.

FIG. 9 shows an example of the format of the entry PTS_EP_coarse and the entry PTS_EP_fine. A PTS, namely the entry PTS_EP_start, has a data length of 32 bits. When the MSB is 32-nd bit and the LSB is 0-th bit, in the example shown in FIG. 9, for the entry PTS_EP_coarse used to make a search in a coarse unit, 14 bits of 32-nd bit to 19-th bit of the entry PTS_EP_start are used. With the entry PTS_EP_coarse, a search of up to 26.5 hours with a resolution of 5.8 seconds can be made. For the entry PTS_EP_fine used to make a search in a fine unit, 11 bits of 19-th bit to 9-th bit are used. With the entry PTS_EP_fine, a search of up to 11.5 seconds with a resolution of 5.7 msec can be made. The 19-th bit is used in common with the entry PTS_EP_coarse and the entry PTS_EP_fine. Nine bits from 0-th bit to 8-th bit on the LSB side are not used.

FIG. 10 shows an example of the format of the entry SPN_EP_coarse and the entry SPN_EP_fine. A source packet number, namely the entry SPN_EP_start, has a data length of 32 bits. When the MSB is 31-st bit and the LSB is 0-th bit, in the example shown in FIG. 10, for the entry SPN_EP_coarse used to make a search in a coarse unit, all bits from 31-th bit to 0-th bit of the entry SPN_EP_start are used. In contrast, for the entry SPN_EP_fine used to make a search in a fine unit, 17 bits from 16-th bit to 0-th bit of the entry SPN_EP_start are used. With the entry SPN_EP_fine, a search of an AV stream file of up to around 25 MB (Mega Bytes) can be made.

For a source packet number, a value of a predetermined number of bits on the MSB side may be used as the entry SPN_EP_coarse. For example, for the entry SPN_EP_coarse, 17 bits from 31-th bit to 16-th bit of the entry SPN_EP_start are used. For the entry SPN_EP_fine, 17 bits from 16-th bit to 0-th bit of the entry SPN_EP_start are used.

FIG. 11 shows an example of the syntax of a table EP_map_for_one_stream_PID ( ) In this example, the syntax is described in the C language, which is a program descriptive language for computer devices and so forth. This applies to other figures that show other syntaxes.

The table EP_map_for_one_stream_PID ( ) constitutes a block EP_map ( ). A field number_of_stream_PID_entries denotes the number of entries of the table EP_map_for_one_stream_PID of EP_map. With an argument of a value [k], the contents of a for loop are repeated for the value of the field number_of_stream_PID_entries. The field stream_PID [k] denotes the value of the PID of a transport packet that transmits an elementary stream referenced by a table EP_map_for_one_stream_PID that is a [k]-th entry of EP_map (hereinafter referred to as the [k]-th table EP_map_for_one_stream_PID). A field EP_stream_type [k] denotes the type of an elementary stream referenced by the [k]-th table EP_map_for_one_stream_PID. A field num_EP_coarse_entries [k] denotes the number of entries of the sub table EP-coarse in the [k]-th table EP_map_for_one_stream_PID. A field num_EP_fine_entries [k] denotes the number of entries of the sub table EP-fine of the [k]-th table EP_map_for_one_stream_PID. A field EP_map_for_one_stream_PID_start_address [k] denotes a relative byte position at which the [k]-th table EP_map_for_one_stream_PID starts in the block EP_map ( ). This value is denoted by a byte number starting with the first byte of the block EP_map ( ).

The for loop is followed by a padding word. After the padding word, a block EP_map_for_one_stream_PID is described. The block EP_map_for_one_stream_PID is EP_map for one stream of a plurality of AV streams multiplexed to a transport stream as described in FIG. 4 and FIG. 5.

FIG. 12 shows an example of the syntax of the block EP_map_for_one_stream_PID. To explain the semantics of the block EP_map_for_one_stream_PID, the meaning of an entry PTS_EP_start and an entry PTS_EP_end that are entries as sources of data stored in the block EP_map_for_one_stream_PID will be described. The entry SPN_EP_start correlated to the entry PTS_EP_start and the entry SPN_EP_start denotes entry points of AV streams. An entry PTS_EP_coarse correlated to an entry PTS_EP_fine and an entry PTS_EP_fine is obtained from the same entry PTS_EP_start. Likewise, an entry SPN_EP_coarse correlated to an entry SPN_EP_fine and an entry SPN_EP_fine is obtained from the same entry SPN_EP_start.

The entry PTS_EP_start and the entry SPN_EP_start are defined as follows.

As shown in FIG. 9, the entry PTS_EP_start is an unsigned integer having a data length of 33 bits. The entry PTS_EP_start denotes a PTS, having a length of 33 bits, of a video access unit that starts with an IDR picture or an I picture of an AV stream as shown in FIG. 6A, FIG. 6B, and FIG. 6C.

As shown in FIG. 10, the entry SPN_EP_start is an unsigned integer having a length of 32 bits. The entry SPN_EP_start denotes an address, in an AV stream, of a source packet including the first byte of a video access unit correlated to the entry PTS_EP_start. The entry SPN_EP_start is denoted by a source packet number counted (incremented), starting from the first source packet of the AV stream file with an initial value of "0".

Next, the semantics of the block EP_map_for_one_stream_PID will be described. As shown in FIG. 12, the block EP_map_for_one_stream_PID is made up of a first for loop that describes a sub table EP_coarse with which a search is made in a coarse unit and a second for loop that describes a sub table EP_fine with which a search is made in a fine unit based on the search result of the first for loop. The first and second for loops are preceded by a field EP_fine_table_start_address. The field EP_fine_table_start_address denotes the start address of the first byte of a field EP_video_type [EP_fine_id] of the second for loop as a relative byte number from the first byte of the block EP_map_for_one_stream_PID ( ). The relative byte number starts with a value of "0".

The first for loop is repeated for the number of entries, Nc, of the sub table EP_coarse with an argument [i]. In the first for loop, a field ref_to_EP_fine_id [i] denotes an entry number of the sub table EP_fine having the entry PTS_EP_fine correlated to the entry PTS_EP_coarse indicated by a field PTS_EP_coarse [i] preceded by the field ref_to_EP_fine_id [i]. The entry PTS_EP_fine and the entry PTS_EP_coarse correlated thereto are obtained from the same entry PTS_EP_start. The field ref_to_EP_fine_id [i] is given by the value of an argument [EP_fine_id] defined in the order of appearance in the second for loop.

The first for loop is followed by a padding word, followed by the second for loop. The second for loop is repeated for the number of lines, Nf, of the sub table EP_fine with an argument [EP_fine_id]. In the second for loop, a field EP_video_type [EP_fine_id], a field I_end_position_offset [EP_fine_id], a field PTS_EP_fine [EP_fine_id], and a field SPN_EP_fine [EP_fine id] are described. The field PTS_EP_fine [EP_fine_id] and the field SPN_EP_fine [EP_fine_id] store the entry PTS_EP_fine and the entry SPN_EP_fine referenced from the sub table EP_fine with the argument [EP_fine_id].

The entry PTS_EP_coarse, the entry PTS_EP_fine, the entry SPN_EP_coarse, and the entry SPN_EP_fine are obtained as follows. It is assumed that the sub table EP_fine contains Nf entries of values arranged in the ascending order of the correlated data SPN_EP_start. The entry PTS_EP_fine is obtained from the corresponding entry PTS_EP_start according to formula (1).

$$PTS\_EP\_fine[EP\_fine\_id]=(PTS\_EP\_start[EP\_fine\_id]>>9)/211 \quad (1)$$

The relationship of the entry PTS_EP_coarse and the corresponding entry PTS_EP_fine is expressed by formulas (2) and (3).

$$PTS\_EP\_coarse[i]=(PTS\_EP\_start[ref\_to\_EP\_fine\_id[i]]>>19)/214 \quad (2)$$

$$PTS\_EP\_fine[ref\_to\_EP\_fine\_id[i]]=(PTS\_EP\_start[ref\_to\_EP\_fine\_id[i]]>>9)/211 \quad (3)$$

The entry SPN_EP_fine is obtained from the corresponding entry SPN_EP_start according to formula (4).

$$SPN\_EP\_fine[EP\_fine\_id]=SPN\_EP\_start[EP\_fine\_id]/217 \quad (4)$$

The relationship of the entry SPN_EP_coarse and the corresponding entry SPN_EP_fine is expressed by formulas (5) and (6).

$$SPN\_EP\_coarse[i]=SPN\_EP\_start[ref\_to\_EP\_fine\_id[i]] \quad (5)$$

$$SPN\_EP\_fine[ref\_to\_EP\_fine\_id[i]]=SPN\_EP\_start[ref\_to\_EP\_fine\_id[i]]/217 \quad (6)$$

In formulas (1) to (6) above, symbol ">>x" indicates that bits exceeding x-th bit on the LSB side of data are used.

Figure 13:
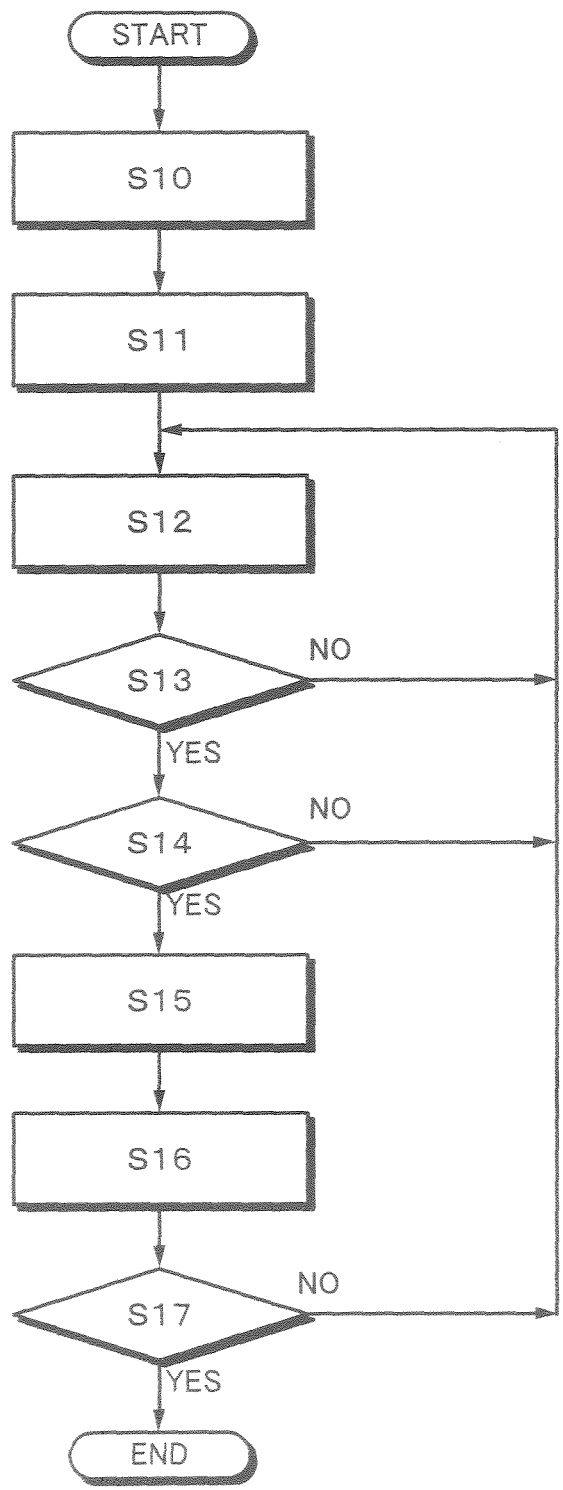
FIG. 13 is a flow chart showing an example of a procedure of creating EP_map.

Next, with reference to a flow chart shown in FIG. 13, a process of creating the foregoing EP_map will be described. The process shown in the flow chart of FIG. 13 is performed by a multiplexed stream analyzing section 25 that will be described later with reference to FIG. 17A and FIG. 17B. As an AV stream that is input as a transport stream having a format described with reference to FIG. 2 and FIG. 3 is recorded on a record medium, the process shown in the flow chart is performed.

The input transport stream is input to the multiplexed stream analyzing section 25. At step S10, the process of creating EP_map is started. At step S11, the multiplexed stream analyzing section 25 analyzes the input transport stream and designates a PID for a video stream of a clip AV stream that is recorded. When the input transport stream contains a plurality of video streams having different PIDs, the multiplexed stream analyzing section 25 designates PIDs for video streams of the clip AV stream that is recorded. At step S12, the multiplexed stream analyzing section 25 selects a transport packet of the video stream having the designated PID from the input transport stream and receives the packet.

At step S13, the multiplexed stream analyzing section 25 determines whether the payload of the received transport packet starts with the first byte of a PES packet. This determination can be made with the value of a flag payload_unit_start_indicator of the transport packet header. When the value is "1", it indicates that the payload of the transport packet starts with the first byte of the PES packet. When the determined result indicates that the payload of the transport packet does not start with the first byte of the PES byte, the flow of the process returns to step S12.

When the determined result at step S13 indicates that the payload of the transport packet starts with the first byte of the PES packet, the flow of the process advances to step S14. At step S14, the multiplexed stream analyzing section 25 determines whether the data portion of the PES packet starts with the first byte of a video access unit that starts with an IDR picture or an I picture described with reference to FIG. 6A, FIG. 6B, and FIG. 6C. This determination is made by checking the access unit delimiter, the SPS, and the PPS that are successively contained in the transport packet as was described with reference to FIG. 7. When the determined result indicates that the PES packet data portion does not start with the first byte of the video access unit, the flow of the process returns to step S12.

When the determined result at step S14 indicates that the PES packet data portion of the PES packet starts with the first byte of the video access unit that starts with an IDR picture or an I picture, the flow of the process advances to step S15. At step S15, the multiplexed stream analyzing section 25 designates the current transport packet (namely, the source packet) as an entry point.

At step S16, the multiplexed stream analyzing section 25 obtains the packet number (source packet number) of the transport packet (source packet) designated as the entry point at step S15, the PTS of the IDR picture or the I picture contained in the packet, and the PID of the video stream to which the entry point belongs. The obtained information is supplied from the multiplexed stream analyzing section 25 to a control section. The control section creates EP_map based on the received information.

The packet number of the transport packet designated as the entry point is obtained by counting up the packet number whenever a transport packet of a video stream is received at step S12, the packet number of the transport packet that contains the first byte of the clip AV stream file being "0". The PTS of an IDR picture or an I picture is contained in the header portion of the PES packet.

At step S17, the multiplexed stream analyzing section 25 determines whether the currently input transport packet is the last input transport packet. When the determined result indicates that the currently input transport packet is the last input transport packet, the process is completed. When the determined result indicates that the currently input transport packet is not the last transport packet, the flow of the process returns to step S12.

Next, the case of which a video PID changes in a transport stream will be described. In this case, as exemplified in FIG. 14A, it is preferred that EP_map contain EP_map as a sub table for each video PID. As exemplified in FIG. 14B, the case of which video PID=x in a first half of a clip AV stream file changes to video PID=y in a second half of the clip AV stream file will be considered.

Figure 14A:
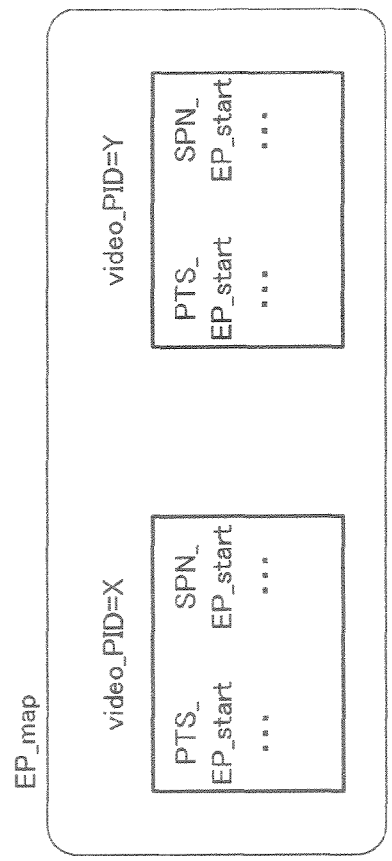
FIG. 14A and FIG. 14B are schematic diagrams describing the case that a video PID changes in a transport stream.
Figure 14B:
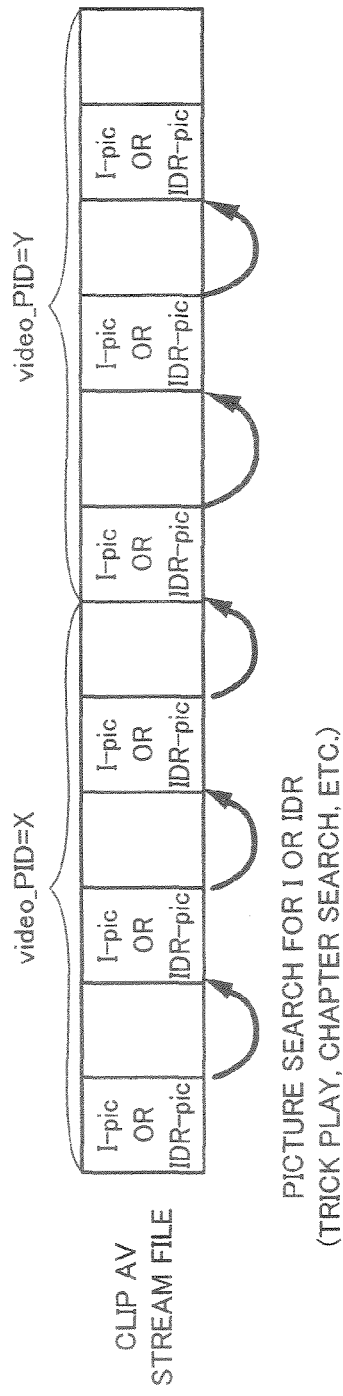

In this case, as exemplified in FIG. 14A, EP_map of a clip information file corresponding to the clip AV stream file contains EP_map corresponding to a transport packet (source packet) having video PID=x and EP_map corresponding to a transport packet having video PID=y as sub tables. The entry PTS_EP_start of EP_map corresponding to video PID=x and the entry PTS_EP_start of EP_map corresponding to PID=y are values in a reproduction sequence on the same time axis. Thus, as exemplified in FIG. 14B, when a search reproduction or the like is performed, the source packet having video PID=x and an IDR picture or an I picture having video PID=y can be successively accessed in the reproduction sequence corresponding to the entry PTS_EP_start of a sub table of EP_map.

Figure 15:
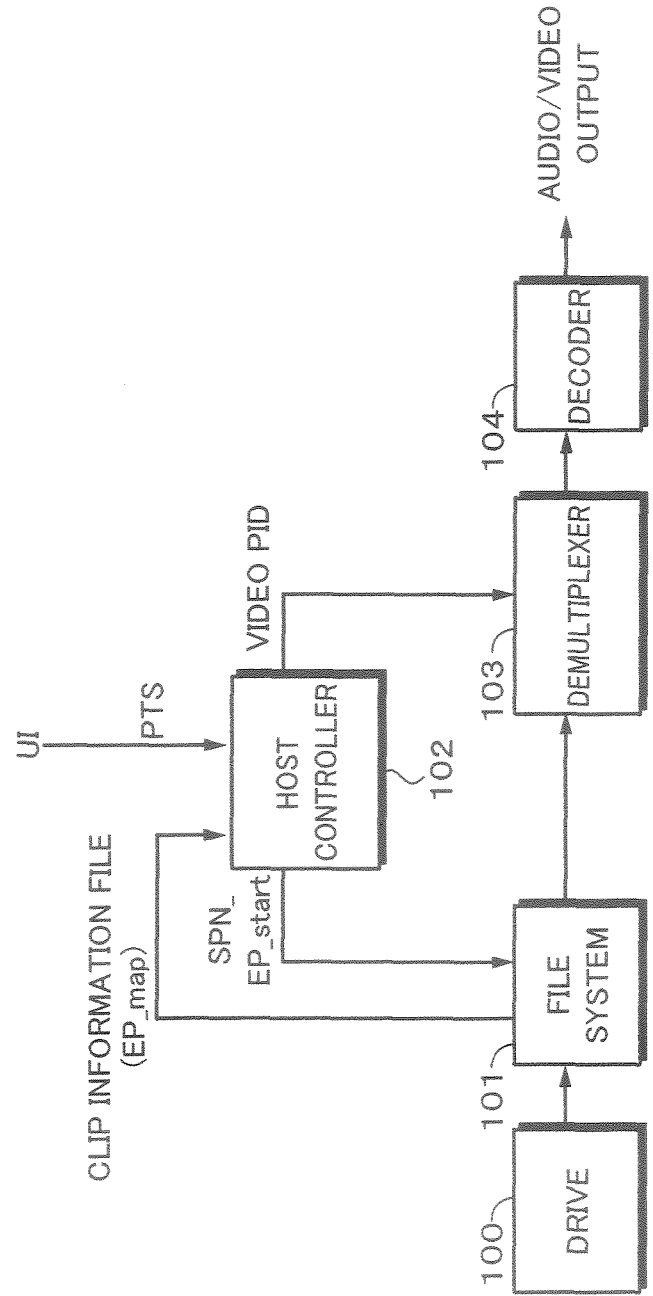
FIG. 15 is a block diagram showing an example of a player model in the case that a search is made for an I picture or an IDR picture.
Figure 16:
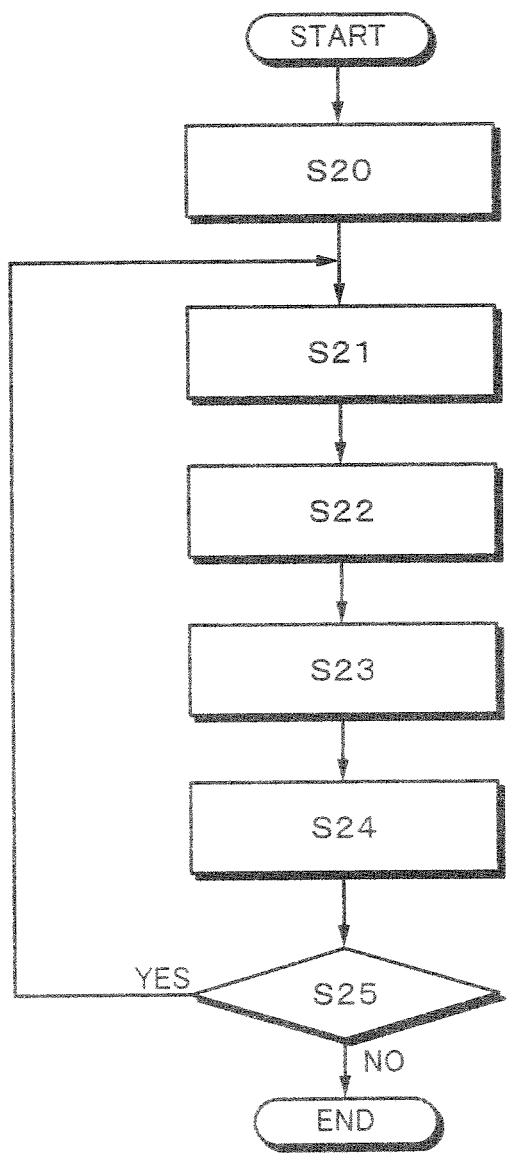
FIG. 16 is a flow chart showing an example of a process of an I picture search in the player model.

Next, a search operation for an I picture or an IDR picture will be described. FIG. 15 shows an example of a player model in the case that a search for an I picture or an IDR picture is made. In the following description, for convenience, a search for an I picture or an IDR picture is called an I picture search. FIG. 16 is a flow chart showing an example of a process for the I picture search in the player model shown in FIG. 15.

In FIG. 15, the player model has a drive 100, a file system 101, a host controller 102, a demultiplexer 103, and a decoder 104. The host controller 102 is made up of for example a CPU (Central Processing Unit). The file system 101, the demultiplexer 103, and the decoder 104 can be made up of hardware or software that runs on the CPU. A user interface (UI) (not shown) informs the host controller of a user's command.

A record medium, for example an optical disc, on which a clip AV stream file has been recorded as a transport stream is loaded into the drive 100. At step S20, the file system 101 reproduces data from the disc loaded into the drive 100, reads a clip information file from the disc, and sends data of EP_map of the information file to the host controller 102.

On the other hand, the UI designates a program number of the program to be reproduced and a PTS for the search start time corresponding to the user's command. The designated values are sent to the host controller 102 (at step S21). At step S22, the host controller 102 searches EP_map for the entry SPN_EP_start corresponding to the PTS denoting the search start time and sets the video PID of the source packet number indicated by the obtained entry SPN_EP_start to the demultiplexer 103.

For example, the sub table EP_coarse of EP_map is searched for the entry PTS_EP_coarse based on 14 bits on the MSB side of the PTS corresponding to the search start time. As a result, the corresponding entry ref_to_EP_fine_id and entry SPN_EP_coarse are obtained. Based on the entry SPN_EP_coarse, a coarse position of the source packet for which a search is made can be obtained. Based on the obtained entry ref_to_EP_fine_id, a search range of the sub table EP_fine is designated. The sub table EP_fine is searched in the designated range. As the search result, the entry PTS_EP_fine corresponding to the value of 10-th bit and 11-th bit on the LSB side of the PTS corresponding to the search start time is obtained. A video PID of a source packet number indicated by the entry SPN_EP_coarse corresponding to the entry PTS_EP_fine is set to the demultiplexer 103.

When the entry SPN_EP_fine uses 17 bits on the MSB side of the entry SPN_EP_start, a video PID of a source packet number corresponding to a value of which the entry SPN_EP_fine and the entry SPN_EP_coarse are connected in a predetermined manner is set to the demultiplexer 103.

At step S23, the host controller 102 sets a data address corresponding to the source packet number obtained at step S22 to the file system 101. The file system 101 sends a command to the drive 100 to read the transport stream from the designated data address. The drive 100 reads the transport stream from the designated data address corresponding to the command. The transport stream is sent to the file system 101. Thereafter, the transport stream is sent from the file system 101 to the demultiplexer 103.

The demultiplexer 103 removes the headers TP_extra_header from the supplied transport stream, obtains transport packets, selects transport packets corresponding to the video PID designated at step S22, removes the headers from the transport packets, connects payloads, and restores the original AV stream. The AV stream is supplied to the decoder 104. The decoder 104 decodes the AV stream and obtains audio data and video data.

At step S25, it is determined whether the user has issued the next search command. When the user has issued the next search command, the flow of the process returns to step S21.

As described above, data of the source packet number of the entry SPN_EP_fine indicates an address of a source packet that contains the first byte of an access unit that starts with an I picture or an IDR picture that is randomly accessible. In the foregoing process, when a search operation or the like is made, an I picture or an IDR picture that is randomly accessible is always accessed. As a result, the random-access reproduction for an MPEG-4 AVC|H.264 video stream is assured.

Figure 17B:
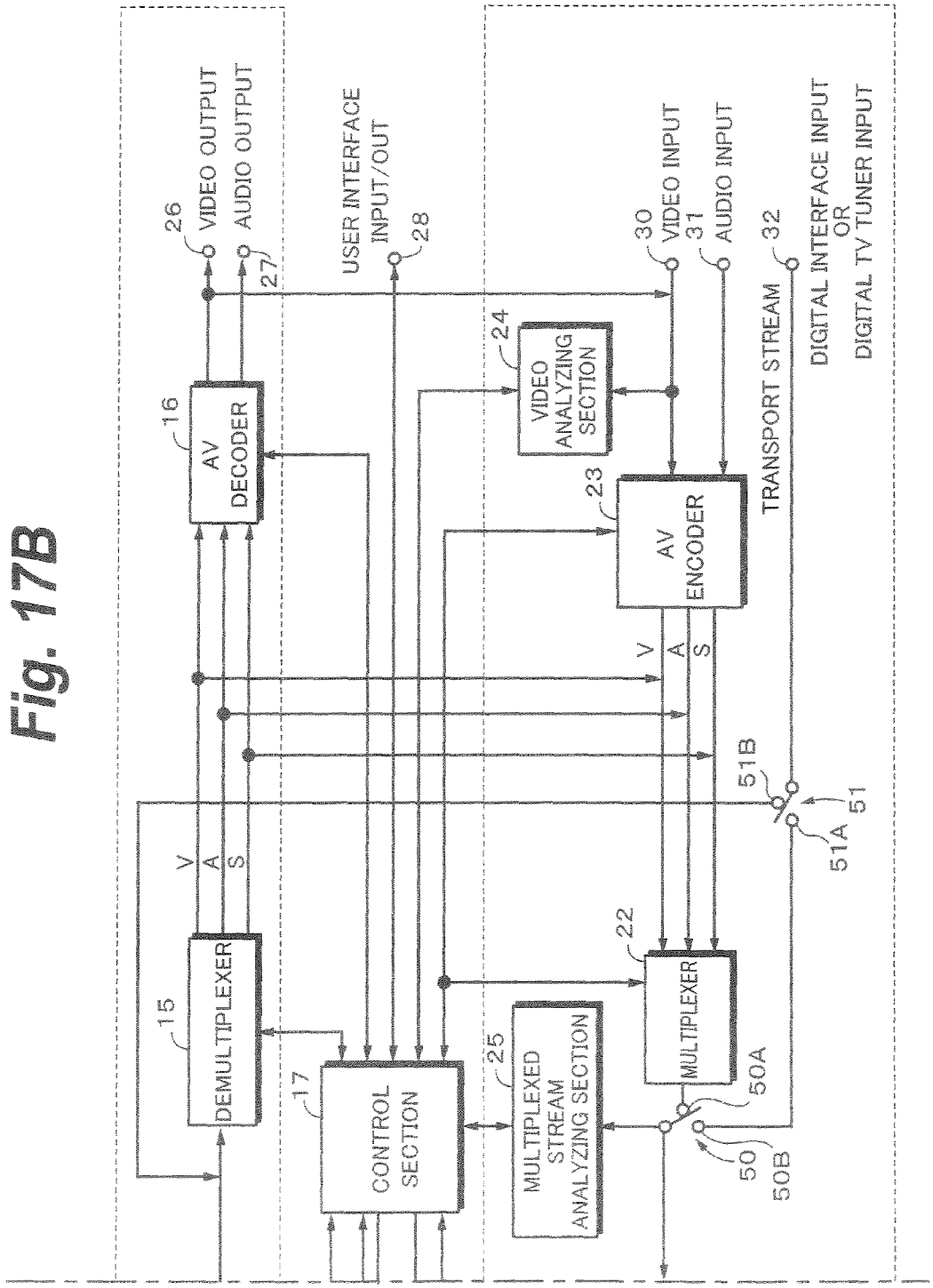

Next, a system that records and reproduces data having the application structure shown in FIG. 2 will be described. FIG. 17A and FIG. 17B show an example of the structure of a moving picture recording and reproducing apparatus according to an embodiment of the present invention.

A control section 17 is made up of for example a CPU (Central Processing Unit), a ROM (Read Only Memory), a RAM (Random Access Memory), and so forth. The ROM pre-stores data necessary to execute a program on the CPU. The RAM is used for a work memory of the CPU. When necessary, the CPU reads a program and data from the ROM, uses the RAM as a work memory, and controls the whole moving picture recording and reproducing apparatus.

Connected to a user interface input/output terminal 28 is a user interface (not shown) that has operation devices such as various types of switches and indication devices that simply indicate data. A control signal corresponding to a user's operation to the user interface is supplied to the control section 17 through the user interface input/output terminal 28. A display control signal generated in the control section 17 is supplied to the user interface through the user interface input/output terminal 28. The user interface can supply the display control signal to a monitor device such as a television receiver to display data corresponding to the display control signal.

First, a recording operation will be described. A video signal is input to an input terminal 30. An audio signal is input to an input terminal 31. The input video signal and audio signal are supplied to an AV encoder 23. The video signal is also supplied to a video analyzing section 24. The AV encoder 23 encodes the input video signal and audio signal and outputs an encoded video stream V, an encoded audio stream A, and system information S.

The AV encoder 23 encodes the input video signal with a restriction like an I picture described with reference to FIG. 6A, FIG. 6B, and FIG. 6C, namely it is prohibited that a picture later than an I picture that belongs to the current GOP in the display order is predicted from a GOP earlier than the current GOP. The AV encoder 23 encodes the input video signal according to an encoding system based on for example the MPEG-4 AVC|H.264 system. In this case, the AV encoder 23 may encode the input video signal in such a manner that an I picture is generated for each GOP or an IDR picture is placed for each GOP.

The AV encoder 23 encodes the audio signal in the format of for example an MPEG1 audio stream or a Dolby AC3 audio stream. The system information S is made up of encoding information about a video signal and an audio signal, for example the byte sizes of encoded picture and audio frame, the encoding type of a picture, and time information about synchronization of a video stream and audio stream, and so forth.

These encoded outputs of the AV encoder 23 are supplied to a multiplexer 22. The multiplexer 22 multiplexes the supplied encoded video stream V and the encoded audio stream A corresponding to the system information S and outputs a multiplexed stream. The multiplexed stream is for example an MPEG2 transport stream or an MPEG2 program stream. When the multiplexed stream is an MPEG2 transport stream, the encoded video stream V, the encoded audio stream A, and the encoded audio stream A are divided by the size of a payload of a transport packet. A predetermined header is added to each transport packet. As a result, a transport packet is formed. The header of each transport packet contains a PID in a predetermined manner so as to identify the type of data.

The multiplexed stream that is output from the multiplexer 22 is supplied to a source packetizer 21 and the foregoing multiplexed stream analyzing section 25 through a terminal 50A selected from a switch 50. The source packetizer 21 encodes the supplied multiplexed stream into a clip AV stream made up of source packets described with reference to FIG. 3 according to the application format of the record medium.

The clip AV stream encoded by the source packetizer 21 is encoded with an error correction code by an ECC (Error Correction Coding) encoding section 20. A modulating section 19 modulates the encoded clip AV stream into a record code and supplies it to a writing section 18. The writing section 18 records a clip AV stream modulated into the record code by the modulating section 19 to a recordable record medium 10 corresponding to a control signal supplied from the control section 17.

The moving picture recording and reproducing apparatus can directly input a transport stream of which clip AV streams have been multiplexed and record the transport stream to a record medium. For example, a transport stream of a digital television broadcast or the like that is output from a digital interface or a television tuner is input to an input terminal 32.

There may be two methods of recording an input transport stream. In the first method, an input transport stream is transparently recorded, whereas in the second method, an input transport stream is re-encoded to decrease a record bit rate. One of the two recording methods is selected by operating for example the user interface. A control signal corresponding to the operation is supplied to the control section 17 through the user interface input/output terminal 28. The control section 17 controls each section of the moving picture recording and reproducing apparatus corresponding to the control signal.

When an input transport stream is transparently recorded, a terminal 50B of the switch 50 is selected and a terminal 51A of a switch 51 is selected. A transport stream that is input from the input terminal 32 is supplied to the source packetizer 21 and the multiplexed stream analyzing section 25 through the switch 51 and the switch 50, respectively. Thereafter, the same process as the case that a video signal and an audio signal that are input from the input terminal 30 and the input terminal 31 are encoded and recorded is performed.

In contrast, when an input transport stream is re-encoded and recorded, a terminal 51B of the switch 51 is selected and a transport stream that is input from the input terminal 32 is supplied to a demultiplexer 15. The demultiplexer 15 demultiplexes the supplied transport stream into an encoded video stream V, an encoded audio stream A, and system information S. The demultiplexer 15 supplies the separated encoded video stream V to an AV decoder 16 and the encoded audio stream A and the system information S to the multiplexer 22.

The AV decoder 16 decodes the encoded video stream V supplied from the demultiplexer 15 and supplies the decoded video signal to the AV encoder 23. The AV encoder 23 encodes the supplied video signal and obtains an encoded video stream V. The AV encoder 23 encodes the video signal like an I picture described with reference to FIG. 6A, FIG. 6B, and FIG. 6. In other words, it is prohibited that a picture later than an I picture that belongs to the current GOP in the display order is predicted from a GOP earlier than the current GOP in the display order. The encoded video stream V is supplied to the multiplexer 22.

The multiplexer 22 multiplexes the encoded video stream V encoded by and supplied from the AV encoder 23 and the encoded audio stream A demultiplexed by the demultiplexer 15 corresponding to the system information S demultiplexed by the demultiplexer 15 and outputs a multiplexed stream. Thereafter, the same process as the case that a video signal and an audio signal that are input to the input terminal 30 and the input terminal 31 are encoded and recorded is performed.

The moving picture recording and reproducing apparatus records a clip AV stream file to the record medium 10 in the foregoing manner and also application database information about the clip AV stream file thereto. The application database information is created by the control section 17 based on feature information of a moving picture supplied from the video analyzing section 24, feature information of the clip AV stream supplied from the multiplexed stream analyzing section 25, and user's designation information that is input from the terminal 28.

The feature information of the moving picture obtained from the video analyzing section 24 is generated in the moving picture recording and reproducing apparatus when a video signal is encoded and recorded by the AV encoder 23 and recorded. A video signal that is input from the input terminal 30 or a video signal of which a transport stream that is input from the input terminal 32 is demultiplexed by the demultiplexer 15 and decoded by the AV decoder 16 is supplied to the video analyzing section 24. The video analyzing section 24 analyzes the contents of the supplied video signal and generates information about a picture corresponding to a feature mark point of the input video signal. For example, the video analyzing section 24 detects a feature mark point such as a program start point, a scene change point, or a CM (Commercial Message) broadcast start/end point and obtains designation information of a picture corresponding to the detected mark point. Instead, the video analyzing section 24 may generate a thumbnail picture of a picture corresponding to a mark point. A thumbnail picture is a reduced picture of which real picture data are reduced by for example a thin-out process. The position of a thumbnail picture in a clip AV stream can be indicated by a PTS.

The designation information of these pictures, a thumbnail picture, and position information (for example, a PTS) of the thumbnail picture are supplied to the multiplexer 22 through the control section 17. When the multiplexer 22 multiplexes an encoded picture of which a picture corresponding to a mark point designated by the control section 17 has been encoded, the multiplexer 22 returns address information of the encoded picture in the clip AV stream to the control section 17. The control section 17 correlates the type of a feature picture to address information of the corresponding encoded picture in the clip AV stream and stores the correlated information to for example the RAM.

Feature information of the clip AV stream obtained from the multiplexed stream analyzing section 25 is information about encoding information of the clip AV stream that is recorded. The feature information is generated in the moving picture recording and reproducing apparatus. The feature information of the clip AV stream includes address information corresponding to a time stamp of an entry point. In addition, the feature information of the clip AV stream includes discontinuity information of an STC (System Time Clock), information about changes of contents of a program, address information corresponding to an arrival time, and so forth.

A time stamp and address information, as an entry point of a clip AV stream, of a video access unit that starts with an IDR picture or an I picture described with reference to FIG. 6A, FIG. 6B, and FIG. 6C are data stored in EP_map. Information about changes of contents of a program in a clip AV stream is data stored in a block ProgramInfo (not shown) of a clip information file.

When a transport stream that is input from the input terminal 32 is transparently recorded, the multiplexed stream analyzing section 25 detects a picture corresponding to a feature mark point in a clip AV stream and generates the type and address information of the detected picture. These information is data stored in a block ClipMark (not shown) of the clip information file. Thus, feature information of the clip AV stream obtained by the multiplexed stream analyzing section 25 is stored in the clip information file, which is a database of a clip AV stream. These information obtained by the multiplexed stream analyzing section 25 is temporarily stored in the RAM of the control section 17.

User's designation information issued to the user interface (not shown) is supplied from the user interface input/output terminal 28 to the control section 17. The designation information includes for example designation information of user's favorite reproduction region in a clip AV stream, characters that describe the contents of the reproduction region, and time stamps of a book mark point that the user designates as his or her favorite scene and a resume point in the clip AV stream. These user's designation information is temporarily stored in the RAM of the control section 17. In addition, these designation information is stored in a database (not shown) for a play list on the record medium 10.

The control section 17 creates a database (clip information) of a clip AV stream, a database for play lists, management information (info.drv) about contents of a record medium, and thumbnail information based on the input information stored in the RAM, namely feature information of a moving picture obtained from the video analyzing section 24, feature information of the clip AV stream obtained from the multiplexed stream analyzing section 25, and user's designation information that is input from the user interface input/output terminal 28. These database information is read from the RAM of the control section 17. Like the clip AV stream, the database information is supplied from the control section 17 to the ECC encoding section 20. The ECC encoding section 20 encodes the database information with an error correction code. The modulating section 19 modulates the encoded database information to a record code. The modulated database information is supplied to the writing section 18. The writing section 18 records the record-encoded database information to the record medium 10 corresponding to a control signal supplied from the control section 17.

Next, a reproducing operation will be described. A clip AV stream file and application database information created in the same manner described in the section of the recording operation have been recorded on the record medium 10. When the record medium 10 is loaded into a drive device (not shown), the control section 17 issues a command to the reading section 11 to read the application database information from the record medium 10. When the reading section 11 receives the command, the reading section 11 reads the application database information from the record medium 10. An output of the reading section 11 is supplied to a demodulating section 12.

The demodulating section 12 demodulates the output of the reading section 11 and decodes the record code to digital data. An output of the demodulating section 12 is supplied to an ECC decoding section 13. The ECC decoding section 13 performs an error correction process for the application database information to decode the error correction code. The error-corrected application database information is supplied to the control section 17.

The control section 17 outputs a table of play lists recorded on the record medium 10 to the user interface through the user interface input/output terminal 28 corresponding to the application database information. The table of play lists is displayed for example on the display section of the user interface in a predetermined manner. The user selects a play list that he or she wants to reproduce from the table of play lists and performs an operation that causes the selected play list to be reproduced for the user interface. A control signal corresponding to this operation is output from the user interface and supplied to the control section 17 through the terminal 28.

The control section 17 sends a command to the reading section 11 to read a clip AV stream file necessary to reproduce the selected play list corresponding to the control signal. Corresponding to the command, the reading section 11 reads the clip AV stream file from the record medium 10. An output of the reading section 11 is supplied to the demodulating section 12. The demodulating section 12 demodulates the supplied signal to a record code, decodes the record code to digital data, and supplies the digital data to the ECC decoding section 13. The ECC decoding section 13 decodes the error correction code of the supplied digital data and corrects errors of the digital data. The error-corrected clip AV stream file is processed by a file system section (not shown) provided by the control section 17 and then supplied to a source depacketizer 14.

The source depacketizer 14 converts the clip AV stream file recorded in the application format on the record medium 10 into a stream that can be input to the demultiplexer 15 under the control of the control section 17. For example, the source depacketizer 14 disassembles a BDAV MPEG2 transport stream (see FIG. 3) reproduced from the record medium 10 into source packets, removes a header TP_extra_header from each packet, and obtains transport packets. The clip AV stream as transport packets is supplied to the demultiplexer 15.

The demultiplexer 15 outputs a video stream A, an audio stream A, and system information S that constitute a reproduction region (PlayItem), designated by the control section 17, of a clip AV stream supplied from the source depacketizer 14 under the control of the control section 17 and supplies them to the AV decoder 16. For example, the demultiplexer 15 selects supplied transport packets based on their PIDs, removes the transport packet header from each of them, and output the resultant data. The AV decoder 16 decodes the supplied video stream V and audio stream A and supplies the decoded reproduction video signal and reproduction audio signal to a video output terminal 26 and an audio output terminal 27, respectively.

In this structure for the reproducing operation, when a play list that the user has selected is reproduced from a particular time of the clip AV stream, the following operation is performed. The control section 17 searches for an entry point having a PTS closest to the designated time, namely an address of a video access unit that starts with an IDR picture or an I picture described with reference to FIG. 6A, FIG. 6B, and FIG. 6C, with EP_map based on the PTS of the designated time. The control section 17 issues a command to the reading section 11 to read the clip AV stream file from the obtained address.

As described above, the clip AV stream file is demodulated, decoded, depacketized, and demultiplexed by the demodulating section 12, the ECC decoding section 13, the source depacketizer 14, the demultiplexer 15, and the AV decoder 16 and then output as a reproduction video signal and a reproduction audio signal to output terminals 26 and 27, respectively.

The reading section 11 reads a clip AV stream file from the record medium 10 corresponding to the command. The clip AV stream file is supplied to the demultiplexer 15 through the demodulating section 12, the ECC decoding section 13, and the source depacketizer 14. The demultiplexer 15 packetizes the clip AV stream file and supplies obtained transport packets to the AV decoder 16.

When the user selects a particular mark from program cue points and scene change points stored in a block ClipMark of the clip information, the reproducing operation is performed in the following manner. The control section 17 causes the user interface (not shown) to display a list of thumbnail pictures of cue points and scene change points of a program stored in a block ClipMark of the clip information. When the user selects his or her favorite thumbnail picture from the list of thumbnail pictures, the reproducing operation is started. When the thumbnail picture is selected, position information (for example a PTS) corresponding to the selected thumbnail picture in the clip AV stream is supplied to the control section 17.

The control section 17 decides the read position of the clip AV stream from the record medium 10 corresponding to the contents of the clip information and sends a command to the reading section 11 to read the clip AV stream. More specifically, the control section 17 searches EP_map for an entry point closest to an address of the picture corresponding to the thumbnail picture that the user has selected in the clip AV stream, namely an address of a video access unit that starts with an IDR picture or an I picture described with reference to FIG. 6A, FIG. 6B, and FIG. 6C, corresponding to a PTS of time corresponding to the thumbnail picture. The control section 17 sends a command to the reading section 11 to read the clip AV stream file from the obtained address.

The clip AV stream file that has been read is demodulated, decoded, depacketized, demultiplexed, and decoded by the demodulating section 12, the ECC decoding section 13, the source depacketizer 14, the demultiplexer 15, and the AV decoder 16 and then output as a reproduction video signal and a reproduction audio signal to the video output terminal 26 and the audio output terminal 27, respectively.

The record medium 10 is not limited to a particular type. For example, a disc-shaped record medium according to the Blu-ray Disc standard may be used as the record medium 10. The Blu-ray Disc standard uses a 12-cm diameter, 0.1 mm thick cover-layered disc as a record medium. The Blu-ray Disc standard also uses a blue-purple laser having a wave length of 405 nm and an objective lens having an aperture of 0.85 as an optical system. The Blue-ray Disc standard accomplishes a record capacity of up to 27 GB (Giga bytes).

Instead, a hard disk may be used as the record medium 10. Besides a disc-shaped record medium, a large-capacity semiconductor memory may be used as the record medium 10. In addition, a recordable DVD (Digital Versatile Disc), for example DVD-R (DVD-Recordable), DVD-RAM (DVD-Random Access Memory), DVD-RW (DVD-Rewritable), DVD+RW (DVD+RW format) may be used as the record medium 10. Likewise, CD-R (Compact Disc-Recordable) or CD-RW (Compact Disc-ReWritable) may be used as the record medium 10.

In addition, the record medium 10 is not limited to a recordable record medium. In other words, a reproduction-only record medium on which data created in the same recording process of the moving picture recording and reproducing apparatus have been recorded may be used as the record medium 10. For example, a reproduction-only disc according to the foregoing Blu-ray Disc standard (this disc is called a BD-ROM) has been proposed. This BD-ROM may be used as the record medium 10. Instead, a reproduction-only DVD-ROM (DVD-Read Only Memory) or CD-ROM (Compact Disc-Read Only Memory) may be used as the record medium 10.

In other words, a clip AV stream that is encoded like an I picture described with reference to FIG. 6A, FIG. 6B, and FIG. 6C, namely it is prohibited that a picture later than an I picture that belongs to the current GOP is predicted from a GOP earlier than the current GOP, and EP_map created corresponding to the encoding process are pre-recorded on such a reproduction-only record medium. The reproduction-only record medium is provided to the user.

When a reproduction-only record medium is used as the record medium 10, the reproducing section performs the same operation as does it perform for a recordable record medium. Of course, the recording section does not perform the recording operation. When a reproduction-only record medium is used, the recording section may be omitted from of the structure shown in FIG. 17A and FIG. 17B as a moving picture reproducing apparatus.

In addition, the reproducing section may be omitted from the structure shown in FIG. 17A and FIG. 17B as a moving picture recording apparatus. In this case, it is preferred that the moving picture recording and reproducing apparatus corresponding to EP_map according to this embodiment reproduce data from the record medium 10 on which the data have been recorded by the moving picture recording apparatus because the search operation can be smoothly performed.

In the foregoing example, the moving picture recording and reproducing apparatus shown in FIG. 17A and FIG. 17B are made up of hardware. Instead, the moving picture recording and reproducing apparatus may be made up of software except for mechanical sections such as a drive section into which the record medium 10 is loaded. In this case, software is pre-stored for example in the ROM of the control section 17. Instead, the moving picture recording and reproducing apparatus may be constituted on a computer device such as a personal computer. In this case, software that causes the computer device to accomplish the moving picture recording and reproducing apparatus is provided as a record medium such as CD-ROM or DVD-ROM on which the software is recorded. When the computer device can be connected to a network such as the Internet, the software may be provided through the network.

In the foregoing description, a multiplexed stream was treated as an MPEG2 transport stream. Instead, the present invention may be applied to a system that deals with an MPEG2 program stream or a DSS (Digital Satellite System) transport stream as a multiplexed stream. When an MPEG2 program stream is used, packs are used instead of source packets.

DESCRIPTION OF REFERENCE NUMERALS

10 RECORD MEDIUM
11 READING SECTION
14 SOURCE DEPACKETIZER
15 DEMULTIPLEXER
16 AV DECODER
17 CONTROL SECTION
18 WRITING SECTION
21 SOURCE PACKETIZER
22 MULTIPLEXER

23 AV ENCODER
24 VIDEO ANALYZING SECTION
25 MULTIPLEXED STREAM ANALYZING SECTION
50, 51 SWITCH
S10 START PROCESS OF CREATIN EP_map.
S11 RECEIVE PID OF VIDEO STREAM OF PROGRAM THAT IS RECORDED.
S12 RECEIVE TRANSPORT PACKETS OF VIDEO STREAM.
S13 DOES PAYLOAD OF TRANSPORT PACKET START WITH FIRST BYTE OF PES PACKET?
S14 DOES PAYLOAD OF PES PACKET START WITH IDR PICTURE OR I PICTURE PACKET?
S14 DOES PAYLOAD OF PES PACKET START WITH IDR PICTURE OR I PICTURE RANDOMLY ACCESSIBLE?
S15 TREAT CURRENT TRANSPORT PACKET AS ENTRY POINT.
S16 INPUT VIDEO PID, TRANSPORT PACKET NUMBER, AND PTS OF IDR PICUTURE OR I PICTURE TO CONTROL SECTION.
S17 LAST TRANSPORT PACKET?
S20 FILE SYSTEM READS CLIP INFORMATION FILE FROM DISC AND SENDS IT TO EP_map.
S21 UI DESIGNATED REPRODUCTION PROGRAM NUMBER, PTS OF SEARCH START NUMBER AND SENDS THEIR VALUES TO HOST.
S22 HOST SETS VIDEO PID OF SOURCE PACKET INDICATED BY SPN_EP_start CORRESPONDING TO SEARCH START TIME TO DEMULTIPLEXER.
S23 HOST SETS DATA ADDRESS CORRESPONDING TO SOURCE PACKET NUMBER OF SPN_EP_start TO FILE SYSTEM.
S24 FILE SYSTEM READS CLIP AV STREAM FROM DESIGNATED DATA ADDRESS.
S25 NEXT SEARCH?

The invention claimed is:

1. A data recording apparatus, comprising:
an encoding unit implemented by processing circuitry and configured to encode an entire video stream including a plurality of units according to an encoding scheme and for generating an encoded video stream,
wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted,
wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit,
wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited,
wherein the video stream is encoded in the plurality of units including the current unit, which is a set of pictures starting with the first independently decodable picture and ending with a picture earlier than a second independently decodable picture that belongs to a unit later than the current unit in a decoding order,
table creating unit implemented by the processing circuitry and configured to create a table which correlates reproduction time information of each independently decodable picture in the encoded video stream to position information in the encoded video stream; and
recording unit implemented by the processing circuitry and configured to correlate the encoded video stream encoded by the encoding unit into the table created by the table creating unit and recording the correlated video stream and table to a record medium,
wherein the table creating unit creates:
a first sub table which correlates coarse reproduction time information in the encoded video stream to the position information corresponding to the coarse reproduction time information, and
a second sub table which correlates fine reproduction time information in the encoded video stream to the position information corresponding to the fine reproduction time information.

2. The data recording apparatus as set forth in claim 1, further comprising:
packetizing unit implemented by the processing circuitry and configured to divide the encoded video stream by a predetermined size and storing the divided encoded video stream in packets having the predetermined size,
wherein the recording unit records the encoded video stream packetized by the packetizing unit on the record medium, and
wherein the table creating unit indicates position information of the encoded video stream in the unit of packets.

3. The data recording apparatus as set forth in claim 1, further comprising:
multiplexing unit implemented by the processing circuitry and configured to multiplex a plurality of encoded video streams encoded by the encoding unit,
wherein the recording unit records the plurality of encoded video streams multiplexed by the multiplexing unit to the record medium, and
wherein the table creating unit creates the table for each of the plurality of encoded video streams multiplexed by the multiplexing unit.

4. The data recording apparatus as set forth in claim 1,
wherein the encoding unit encodes the video stream according to MPEG-4 AVC|H.264 standard, and
wherein the independently decodable picture is a picture having slices that are entirely made up of I slices.

5. The data recording apparatus as set forth in claim 1,
wherein the encoding unit encodes the video stream according to MPEG-4 AVC|H.264 standard, and
wherein an independently decodable picture in one sub-scheme is an IDR picture.

6. A data recording method comprising the steps of:
encoding an entire video stream according to an encoding scheme and generating an encoded video stream,
wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted,
wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit, wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in a plurality of units including the current unit, which is a set of pictures starting with the first independently decodable picture and ending with a picture earlier than a second independently decodable picture that belongs to a unit later than the current unit in a decoding order;

creating a table which correlates reproduction time information of each independently decodable picture in the encoded video stream to position information in the encoded video stream; and correlating the encoded video stream encoded at the encoding step to the table created at the table creating step and recording the correlated video stream and table to a record medium, wherein creating the table further includes creating:

a first sub table which correlates coarse reproduction time information in the encoded video stream to the position information corresponding to the coarse reproduction time information, and a second sub table which correlates fine reproduction time information in the encoded video stream to the position information corresponding to the fine reproduction time information.

7. A non-transitory computer readable medium having stored thereon a data recording program which causes a computer device to execute a data recording method comprising the steps of:

encoding an entire video stream including a plurality of units according to an encoding scheme and generating an encoded video stream, wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted, wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit, wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in the plurality of units including the current unit, which is a set of pictures starting with the first independently decodable picture and ending with a picture earlier than a second independently decodable picture that belongs to a unit later than the current unit in a decoding order;

creating a table which correlates reproduction time information of each independently decodable picture in the encoded video stream to position information in the encoded video stream; and correlating the encoded video stream encoded at the encoding step to the table created at the table creating step and recording the correlated video stream and table to a record medium, wherein creating the table further includes creating:

a first sub table which correlates coarse reproduction time information in the encoded video stream to the position information corresponding to the coarse reproduction time information, and a second sub table which correlates fine reproduction time information in the encoded video stream to the position information corresponding to the fine reproduction time information.

8. A data reproducing apparatus which reproduces data from a record medium on which a video stream has been encoded, the data reproducing apparatus comprising:

reproducing unit implemented by processing circuitry and configured to reproduce data from the record medium on which is stored the entire video stream including a plurality of units which has been encoded and generated according to an encoding scheme, wherein the encoding scheme includes at least two sub-schemes of the at least two sub-schemes, and in one sub-scheme, predicting a picture, which occurs earlier in a display order than a first independently decodable picture that belongs to a current unit, from a picture, which belongs to a unit earlier than the current unit, is permitted, wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit, wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in the plurality of units including the current unit, which is a set of pictures starting with the first independently decodable picture and ending with a picture earlier than a second independently decodable picture that belongs to a unit later than the current unit in a decoding order, and a table which correlates reproduction time information of each independently decodable picture in the encoded video stream to position information in the encoded video stream have been correlatively recorded; and decode controlling unit implemented by the processing circuitry and configured to decode the encoded video stream reproduced by the reproducing unit from a position indicated by the position information corresponding to the reproduction time information in the encoded video stream based on the table reproduced by the reproducing unit,
wherein the table further includes:
a first sub table which correlates coarse reproduction time information in the encoded video stream to the position information corresponding to the coarse reproduction time information, and
a second sub table which correlates fine reproduction time information in the encoded video stream to the position information corresponding to the fine reproduction time information.

9. The data reproducing apparatus as set forth in claim 8, wherein the encoded video stream recorded on the record medium is randomly accessed based on the table.

10. The data reproducing apparatus as set forth in claim 8, wherein the encoded video stream has been divided by a predetermined size, stored in packets having the predetermined size, and recorded on the record medium, and
wherein the table indicates position information of the encoded video stream in the unit of packets.

11. The data reproducing apparatus as set forth in claim 8, wherein a plurality of video streams have been encoded, multiplexed, and recorded on the record medium, and
wherein the table for each of the plurality of encoded video streams multiplexed has been recorded on the record medium.

12. The data reproducing apparatus as set forth in claim 8, wherein the decode controlling unit searches the first table for the coarse reproduction time information based on a designated reproduction time and obtains a first search result, searches the second table for the fine reproduction time information based on the first search result, obtains a second search result, and obtains the position information with which the encoded video stream is decoded corresponding to the designated reproduction time based on at least the second search result.

13. The data reproducing apparatus as set forth in claim 8, wherein the encoded video stream has been encoded according to MPEG-4 AVC|H.264 standard, and
wherein the independently decodable picture is a picture having slices that are entirely made up of I slices.

14. The data reproducing apparatus as set forth in claim 8, wherein the encoded video stream has been encoded according to MPEG-4 AVC|H.264 standard, and
wherein an independently decodable picture in one sub-scheme is an IDR picture.

15. A data reproducing method of reproducing data from a record medium on which a video stream has been encoded, the data reproducing method comprising the steps of:
reproducing data from the record medium on which is stored the entire video stream including a plurality of units which has been encoded and generated according to an encoding scheme,
wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted,
wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit,
wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited,
wherein the video stream is encoded in the plurality of units including the current unit, which is a set of pictures starting with the first independently decodable picture and ending with a picture earlier than a second independently decodable picture that belongs to a unit later than the current unit in a decoding order, and
wherein the record medium includes table which correlates reproduction time information of each independently decodable picture in the encoded video stream to position information in the encoded video stream have been correlatively recorded; and decoding the encoded video stream reproduced at the reproducing step from a position indicated by the position information corresponding to the reproduction time information in the encoded video stream based on the table reproduced at the reproducing step,
wherein the table further includes:
a first sub table which correlates coarse reproduction time information in the encoded video stream to the position information corresponding to the coarse reproduction time information, and
a second sub table which correlates fine reproduction time information in the encoded video stream to the position information corresponding to the fine reproduction time information.

16. A non-transitory computer readable medium having stored thereon a data reproducing program which causes a computer device to execute a data reproducing method of reproducing data from a record medium on which a video stream has been encoded, the data reproducing method comprising the steps of:
reproducing data from the record medium on which is stored the entire video stream including a plurality of units which has been encoded and generated according to an encoding scheme,
wherein the encoding scheme includes at least two sub-schemes, and in a first sub-scheme of the at least two sub-schemes, predicting a picture, which occurs earlier in a display order than the first independently decodable picture that belongs to a current unit, from a picture, which belongs to a unit earlier than the current unit, is permitted,
wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit,
wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in the plurality of units including the current unit, which is a set of pictures starting with the first independently decodable picture and ending with a picture earlier than a second independently decodable picture that belongs to a unit later than the current unit in a decoding order, and wherein the record medium includes a table which correlates reproduction time information of each independently decodable picture in the encoded video stream to position information in the encoded video stream have been correlatively recorded; and decoding the encoded video stream reproduced at the reproducing step from a position indicated by the position information corresponding to the reproduction time information in the encoded video stream based on the table reproduced at the reproducing step, wherein the table further includes:

a first sub table which correlates coarse reproduction time information in the encoded video stream to the position information corresponding to the coarse reproduction time information, and a second sub table which correlates fine reproduction time information in the encoded video stream to the position information corresponding to the fine reproduction time information.

17. A non-transitory computer readable record medium, having stored thereon:

an entire video stream which has been encoded and generated including a plurality of units according to an encoding scheme, wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted, wherein the encoding scheme, for each sub-scheme of the at least two sub-schemes, prohibits predicting a picture, which occurs later in a display order than a respective first independently decodable picture that belongs to a respective current unit, from a picture, which belongs to a unit earlier than the respective current unit, wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in the plurality of units including the current unit, which is a set of pictures starting with the first independently decodable picture and ending with a picture earlier than a second independently decodable picture that belongs to a unit later than the current unit in a decoding order; and a table which correlates reproduction time information of each independently decodable picture in the encoded video stream to position information in the encoded video stream having been correlatively recorded, wherein the table further includes:

a first sub table which correlates coarse reproduction time information in the encoded video stream to the position information corresponding to the coarse reproduction time information, and a second sub table which correlates fine reproduction time information in the encoded video stream to the position information corresponding to the fine reproduction time information.

18. The non-transitory computer readable record medium as set forth in claim 17, wherein the encoded video stream has been divided by a predetermined size, stored in packets having the predetermined size, and recorded, and wherein the table indicates position information of the encoded video stream in the unit of packets.

19. The non-transitory computer readable record medium as set forth in claim 17, wherein a plurality of video streams have been encoded, multiplexed, and recorded, and wherein the table for each of the plurality of encoded video streams multiplexed has been recorded.

20. The non-transitory computer readable record medium as set forth in claim 17, wherein the encoded video stream has been encoded according to MPEG-4 AVC|H.264 standard, and wherein the independently decodable picture is a picture having slices that are entirely made up of I slices.

21. The non-transitory computer readable record medium as set forth in claim 17, wherein the encoded video stream has been encoded according to MPEG-4 AVC|H.264 standard, and wherein an independently decodable picture in one sub-scheme is an IDR picture.

22. A non-transitory computer readable medium having stored thereon a data structure comprising:

an entire video stream including a plurality of units which has been encoded and generated according to an encoding scheme, wherein the encoding scheme includes at least two sub-schemes, and in a first sub-scheme of the at least two sub-schemes, predicting a picture, which occurs earlier in a display order than a first independently decodable picture that belongs to a current unit, from a picture, which belongs to a unit earlier than the current unit, is permitted, wherein the encoding scheme, for each sub-scheme, prohibits predicting a picture, which occurs later in a display order than a respective first independently decodable picture that belongs to a respective current unit, from a picture, which belongs to a unit earlier than the respective current unit, wherein, in the first sub-scheme, predicting a picture, which occurs earlier in a display order than a respective first independently decodable picture that belongs to the current unit, from a picture, which belongs to a unit earlier than the current unit, is permitted, and predicting a picture, which occurs later in a display order than the respective first independently decodable picture that belongs to the current unit, from a picture, which belongs to a unit earlier than the current unit, is prohibited, wherein the video stream is encoded in the plurality of units including the current unit, which is a set of pictures starting with the first independently decodable picture and ending with a picture earlier than a second independently decodable picture that belongs to a unit later than the current unit in a decoding order; and a table which correlates reproduction time information of each independently decodable picture in the encoded video stream to position information in the encoded video stream having been correlated, wherein the table further includes:

a first sub table which correlates coarse reproduction time information in the encoded video stream to the position information corresponding to the coarse reproduction time information, and a second sub table which correlates fine reproduction time information in the encoded video stream to the position information corresponding to the fine reproduction time information.

* * * * *